United States Patent
Nagai et al.

[11] Patent Number: 6,041,625
[45] Date of Patent: Mar. 28, 2000

[54] WASHING MACHINE WITH DIRECT DRIVE MECHANISM FOR ROTATABLE TUB AND AGITATOR

[75] Inventors: Kazunobu Nagai, Aichi-gun; Masahiro Imai, Tajimi, both of Japan

[73] Assignee: Kabushiki Kaisha Toshiba, Kawasaki, Japan

[21] Appl. No.: 08/887,632

[22] Filed: Jul. 3, 1997

[30] Foreign Application Priority Data

Jul. 5, 1996 [JP] Japan ................ 8-176201

[51] Int. Cl.⁷ ................ D06F 33/02
[52] U.S. Cl. ................ 68/12.02; 68/12.16
[58] Field of Search ................ 68/12.02, 12.12, 68/12.14, 12.16; 318/254

[56] References Cited

U.S. PATENT DOCUMENTS

| | | | |
|---|---|---|---|
| 3,304,481 | 2/1967 | Saussele et al. | 318/138 |
| 3,329,852 | 7/1967 | Saussele et al. | 318/138 |
| 3,806,785 | 4/1974 | DeValroger et al. | 318/254 |
| 4,047,083 | 9/1977 | Plunkett | 318/231 |
| 4,295,189 | 10/1981 | Boys | 363/41 |
| 4,385,265 | 5/1983 | Uzuka | 318/138 |
| 4,392,094 | 7/1983 | Kuhulein | 318/254 |
| 4,437,325 | 3/1984 | Bershberger | 68/23.7 |
| 4,511,827 | 4/1985 | Morinaga et al. | 318/254 |
| 4,542,633 | 9/1985 | Hirooka et al. | 68/12.02 |
| 4,562,524 | 12/1985 | Mutoh et al. | 363/41 |
| 4,617,675 | 10/1986 | Ashikaga et al. | 375/22 |
| 4,710,683 | 12/1987 | Bahn et al. | 318/254 |
| 4,746,843 | 5/1988 | Taenzer | 318/138 |
| 4,780,652 | 10/1988 | Rilly | 318/254 |
| 4,814,674 | 3/1989 | Hrassky | 318/254 |
| 4,855,652 | 8/1989 | Yamashita et al. | 318/268 |
| 5,091,841 | 2/1992 | Tuusa | 363/98 |
| 5,092,140 | 3/1992 | Matsuo et al. | 68/12.14 X |
| 5,177,417 | 1/1993 | Lee et al. | 318/254 |
| 5,181,398 | 1/1993 | Tanaka et al. | 68/12.14 X |
| 5,301,523 | 4/1994 | Payne et al. | 68/12.16 |
| 5,448,141 | 9/1995 | Kelley et al. | 318/254 |
| 5,475,290 | 12/1995 | Tani et al. | 318/254 |
| 5,813,069 | 9/1998 | Kim | 68/12.02 X |

FOREIGN PATENT DOCUMENTS

| | | |
|---|---|---|
| 0450883A2 | 10/1991 | European Pat. Off. |
| 2253215A | 9/1992 | United Kingdom . |
| 2266196A | 10/1993 | United Kingdom . |
| 96/15583 | 5/1996 | WIPO . |

OTHER PUBLICATIONS

"Motion Control with Permanent–Magnet AC Machines", Thomas M. Jahns, Proceedings of The IEEE, vol. 83, No. 8, Aug. 1994, pp. 1241–1252.
"The Electrical Engineering Handbook", Richard C. Dorf (Editor in Chief), CRC Press, pp. 694–737. (No Date).
New Zealand Specification No. 211214 Apr. 19, 1989.
New Zealand Specification No. 228501 Mar. 1990.
New Zealand Specification No. 236541 Sep. 1995.
New Zealand Specification No. 236542 Apr. 1997.

*Primary Examiner*—Philip R. Coe
*Attorney, Agent, or Firm*—Pillsbury Madison & Sutro LLP

[57] ABSTRACT

A full automatic washing machine includes an outer tub, a rotatable tub mounted for rotation in the outer tub, an agitator mounted for rotation in the rotatable tub, a brushless motor for directly driving the agitator or the rotatable tub and the agitator, and a Hall IC for detecting a rotational position of a rotor of the brushless motor, generating a position signal. A sinusoidal energization signal is formed on the basis of the position signal generated by the Hall IC. The brushless motor is energized on the basis of the formed energization signal.

48 Claims, 31 Drawing Sheets

FIG. 10A DRIVE COMMAND

FIG. 10B VOLTAGE COMMAND Vc

FIG. 10C PHASE COMMAND Pc

TABLE OF POSITION SIGNAL DATA

| POSITION SIGNAL | | | POSITION SIGNAL MODE (n) |
|---|---|---|---|
| Hu | Hv | Hw | |
| H | L | H | 1 |
| H | L | L | 2 |
| H | H | L | 3 |
| L | H | L | 4 |
| L | H | H | 5 |
| L | L | H | 6 |

FIG. 11

TABLE OF ELECTRICAL ANGLE DATA

| MODE | ELECTRICAL ANGLE DATA Ex (n) |
|---|---|
| 1 | 32 |
| 2 | 96 |
| 3 | 160 |
| 4 | 224 |
| 5 | 288 |
| 6 | 352 |

FIG. 12

TABLE OF RECTANGULAR WAVE DATA

| MODE | OUTPUT WAVEFORM DATA | | | SELECTION SIGNAL | | | | | |
|---|---|---|---|---|---|---|---|---|---|
| | Du | Dv | Dw | U1 | U2 | V1 | V2 | W1 | W2 |
| 1 | Vc | Vc | Vc | H | L | L | H | L | L |
| 2 | Vc | Vc | Vc | H | L | L | L | L | H |
| 3 | Vc | Vc | Vc | L | L | H | L | L | H |
| 4 | Vc | Vc | Vc | L | H | H | L | L | L |
| 5 | Vc | Vc | Vc | L | H | L | L | H | L |
| 6 | Vc | Vc | Vc | L | L | L | H | H | L |

FIG. 13

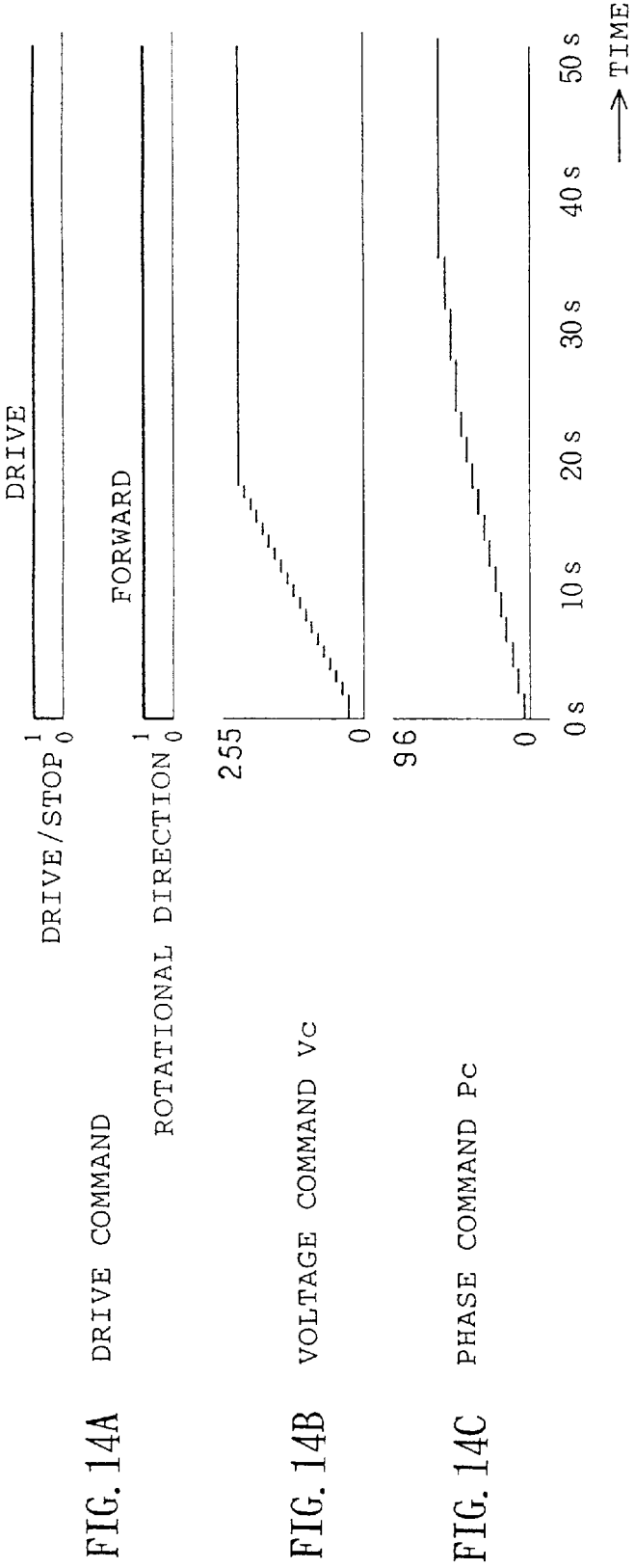

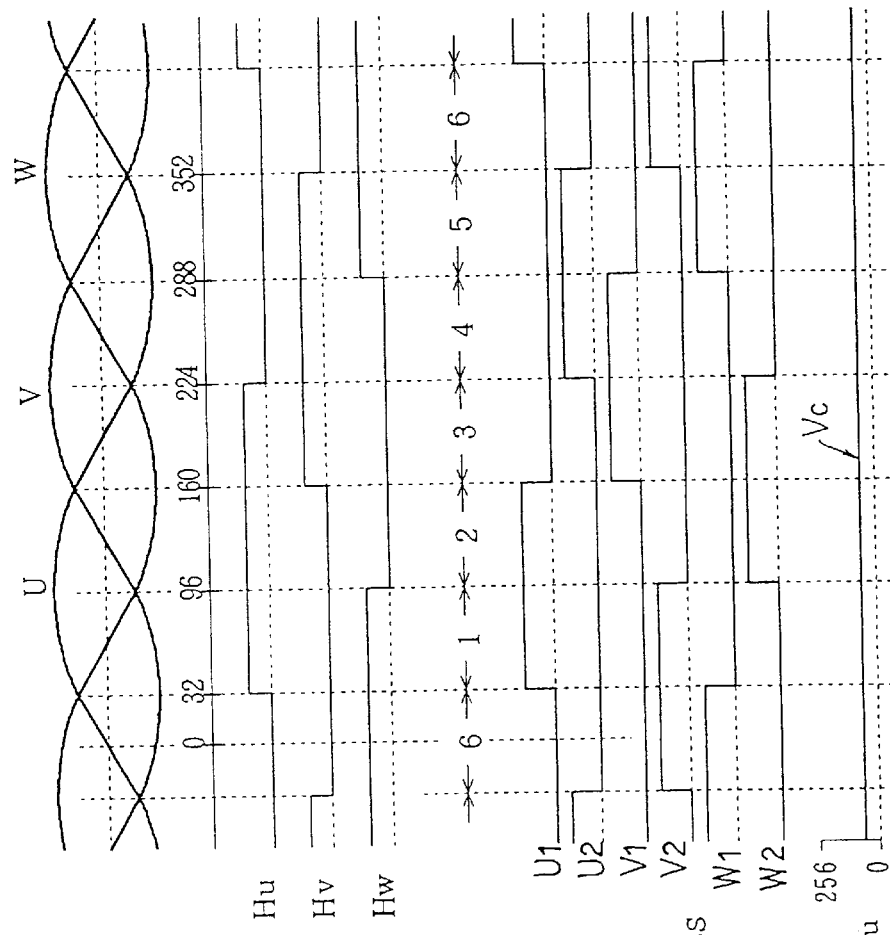
FIG. 19A INDUCED VOLTAGE
FIG. 19B ELECTRICAL ANGLE DATA
FIG. 19C POSITION SIGNALS
FIG. 19D MODE (n)
FIG. 19E MICROCOMPUTER OUTPUT SIGNALS
FIG. 19F MICROCOMPUTER OUTPUT DATA Du

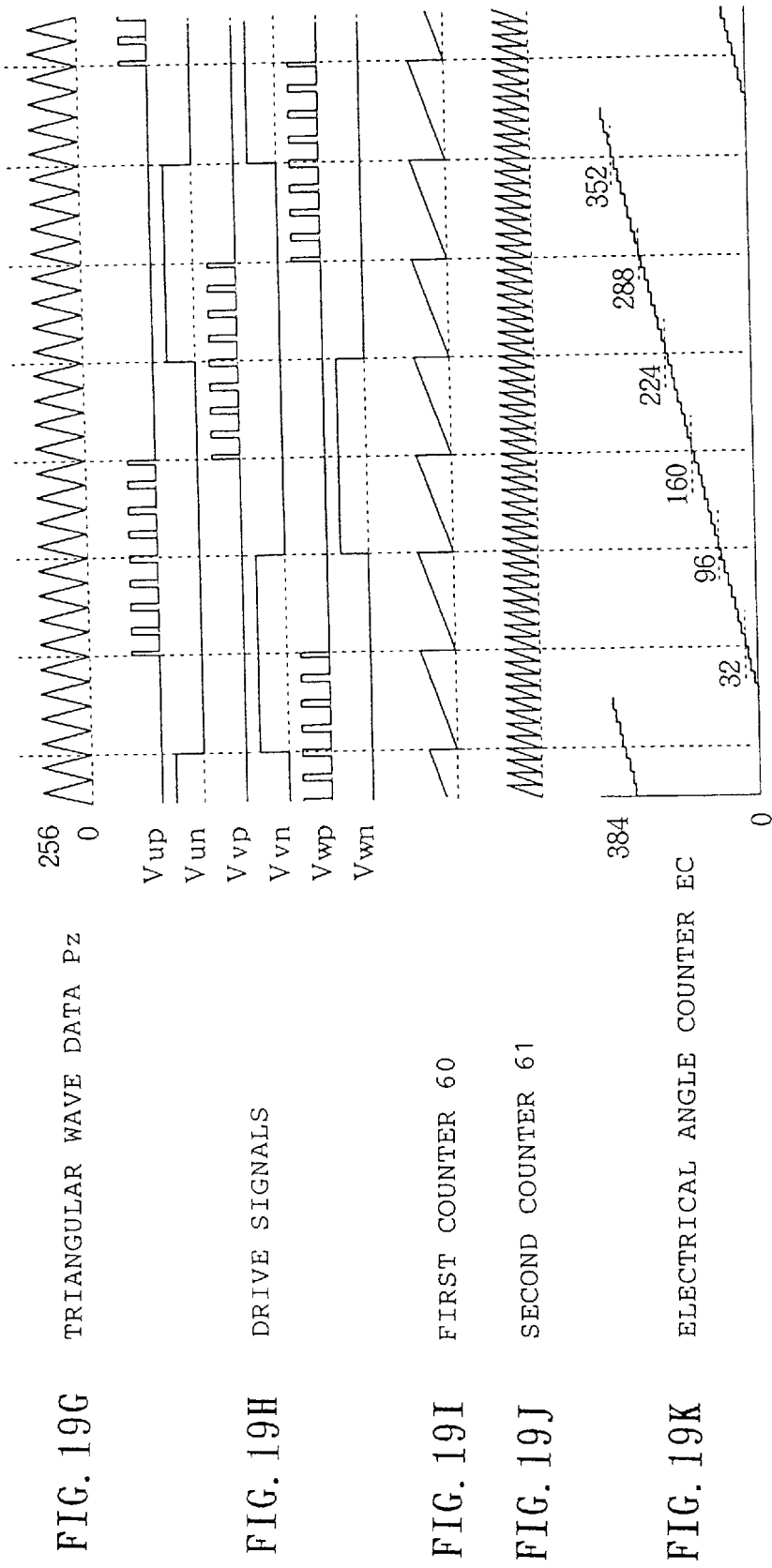

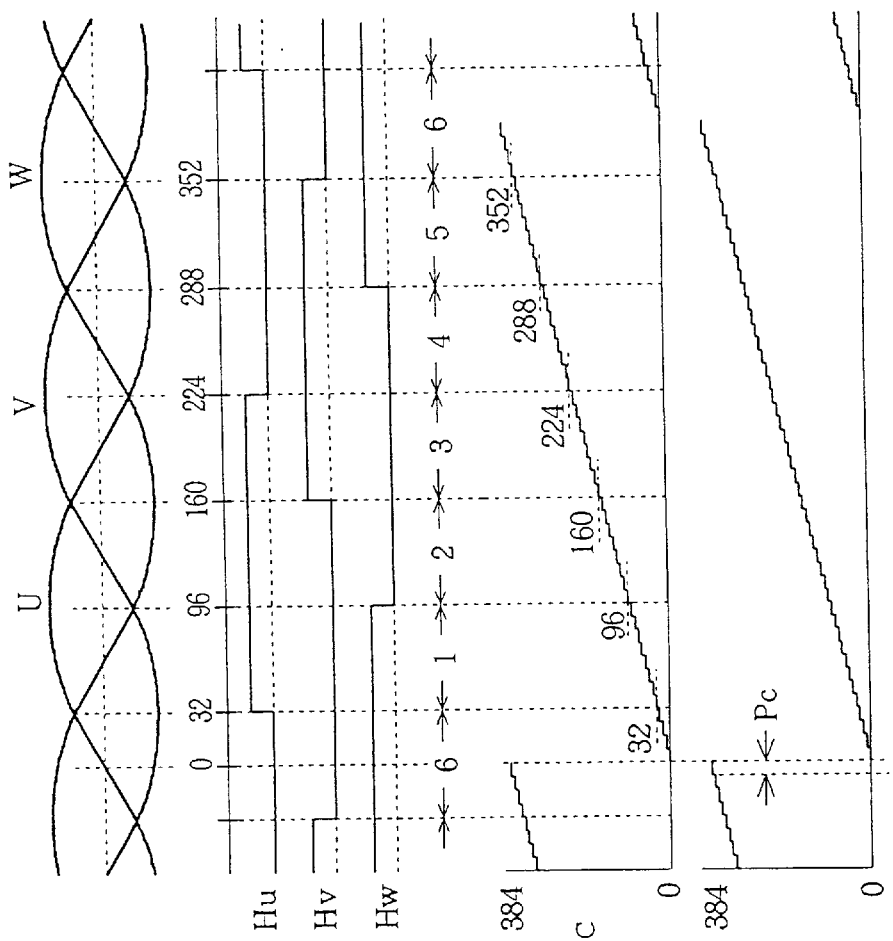
FIG. 20A INDUCED VOLTAGE
FIG. 20B ELECTRICAL ANGLE DATA
FIG. 20C POSITION SIGNALS
FIG. 20D MODE (n)
FIG. 20E ELECTRICAL ANGLE COUNTER EC
FIG. 20F VOLTAGE PHASE Pv

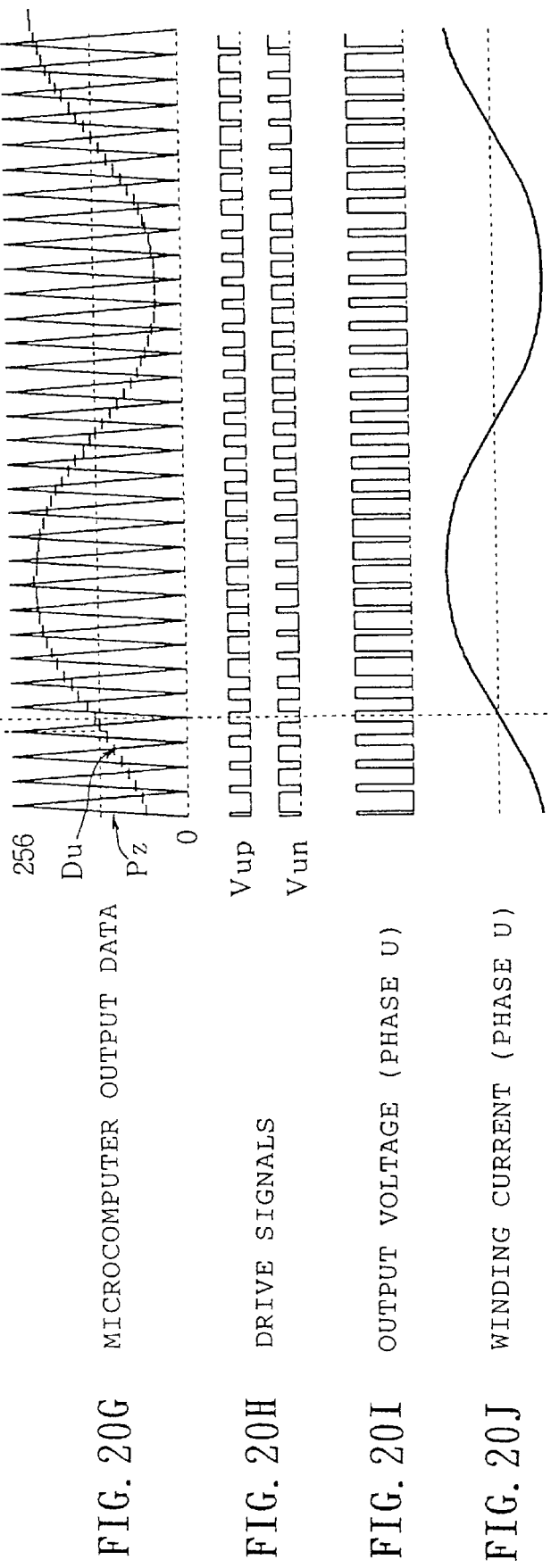
FIG. 20G MICROCOMPUTER OUTPUT DATA
FIG. 20H DRIVE SIGNALS
FIG. 20I OUTPUT VOLTAGE (PHASE U)
FIG. 20J WINDING CURRENT (PHASE U)

TABLE OF ROTATIONAL PERIOD ZONE DATA

| ROTATIONAL SPEED IN RPM | ZONE ZT | ROTATIONAL PERIOD DATA | |
|---|---|---|---|
| | | TmH | TmL |
| 0 ~ 50 | 0 | 65535 | 12500 |
| 50 ~ 100 | 1 | 12500 | 6250 |
| 100 ~ 200 | 2 | 6250 | 3125 |
| 200 ~ 400 | 3 | 3125 | 1563 |
| 400 ~ 600 | 4 | 1563 | 1042 |
| 600 ~ 800 | 5 | 1042 | 781 |
| 800 ~ 1000 | 6 | 781 | 625 |
| 1000 ~ 1200 | 7 | 625 | 0 |

FIG. 27

TABLE OF MULTIPLIED DATA

| ZONE ZT | NUMBER OF SHIFTING OPERATIONS | ELECTRICAL ANGLE INCREASE DATA Ed |
|---|---|---|
| 0 | 3 | 1 |
| 1 | 2 | 2 |
| 2 | 2 | 2 |
| 3 | 1 | 4 |
| 4 | 1 | 4 |
| 5 | 0 | 8 |
| 6 | 0 | 8 |
| 7 | 0 | 8 |

FIG. 28

TABLE OF ELECTRICAL ANGLE DATA

| MODE | ELECTRICAL ANGLE DATA Ex (n) |
|---|---|
| 1 | 32 |
| 2 | 96 |
| 3 | 168 |
| 4 | 224 |
| 5 | 288 |
| 6 | 360 |

FIG. 29

FIG. 30A ELECTRICAL ANGLE DATA

FIG. 30B POSITION SIGNALS

FIG. 30C MODE n

FIG. 30D CHANGE PERIOD Ts(n)

FIG. 30E ELECTRICAL ANGLE DATA CALCULATION RESULTS E(n)

FIG. 30F FIRST COUNTER 60

FIG. 30G SECOND COUNTER 61

FIG. 30H ELECTRICAL ANGLE COUNTER

WASHING MACHINE WITH DIRECT DRIVE MECHANISM FOR ROTATABLE TUB AND AGITATOR

BACKGROUND OF THE INVENTION

1. Field of the Invention

This invention relates to a washing machine provided with a direct drive type electric motor for directly driving a rotatable tub and an agitator.

2. Description of the Prior Art

Conventional full automatic washing machines comprise a rotatable tub rotatably mounted in an outer tub and serving both as a wash tub and as a dehydration or drying basket and an agitator mounted in the rotatable tub. A single electric motor is provided for driving both of the rotatable tub and the agitator. More specifically, in a washing operation, a motor speed is decelerated and its rotation is transmitted only to the agitator so that the same is driven repeatedly alternately in the forward and reverse directions. In a drying operation, the motor speed is not decelerated and its rotation is transmitted both to the rotatable tub and to the agitator so that both of them are rotated at high speeds.

A rotation transmission path from the motor to the rotatable tub and the agitator includes a belt transmission mechanism and a gear reduction mechanism having planetary gears in the above-described washing machine. This belt transmission mechanism and gear reduction mechanism increase the weight and the height of the washing machine, resulting in an increase in the size thereof. Furthermore, a loud noise is produced during operation of the gear reduction mechanism.

To solve the above-described problems, the prior art has proposed a direct drive mechanism including a direct drive type motor for driving the rotatable tub and the agitator. The direct drive mechanism includes a clutch for changing between an arrangement where the agitator is directly driven repeatedly in the forward and reverse directions with the rotatable tub being stopped and an arrangement where both of the rotatable tub and the agitator are directly driven at high speeds. Thus, since the rotatable tub and the agitator are driven directly by the motor, the belt transmission mechanism and gear reduction mechanism are eliminated. Consequently, the weight and height of the washing machine can be reduced, and the noise due to the operation of the gear reduction mechanism is eliminated.

The above-described washing machine requires an electric motor which produces a high torque and whose rotational speed is variable in a wide range from a low speed to a high speed. In view of these needs, a brushless dc motor has been proposed to be used in the above-described washing machine. The brushless dc motor is controlled by an inverter and provided with three Hall ICs, for example, for detecting a rotational position of a rotor of the motor. Based on position signals produced by the Hall ICs, the inverter generates a rectangular wave voltage energizing the motor for a period corresponding to an electrical angle of 120 degrees in each one ac cycle. The inverter supplies the generated rectangular wave voltage to a stator winding of the brushless motor to thereby drive the latter. The above-described arrangement, to obtain the rotor position signals from the Hall ICs, is very simple and cost-effective.

Switching a phase to be energized or commutation results in the variations in the torque when the brushless motor is energized from the rectangular wave voltage as in the above-described motor control manner. The torque variations cause vibrations in the brushless motor, resulting in noise due to operation of the motor. The operation noise is reduced to a certain level in the above-described washing machine since it employs the direct drive mechanism. Under this condition, the noise due to the torque variations is conspicuous. Furthermore, the brushless motor is mounted on an outer tub of the washing machine. Accordingly, the outer tub resonates to the vibration of the brushless motor such that the operation noise is increased.

SUMMARY OF THE INVENTION

Therefore, an object of the present invention is to provide a washing machine wherein the rotatable tub and the agitator are directly driven by the brushless motor and wherein the vibration and noise due to operation thereof can further be reduced.

The present invention provides a washing machine comprising an outer tub, a rotatable tub rotatably mounted in the outer tub, an agitator rotatably mounted in the rotatable tub, and a brushless motor for directly driving at least one of the rotatable tub and the agitator, the brushless motor including a rotor and a winding in which an induced voltage induced therein has a substantially sinusoidal waveform. A rotor position detector is provided for detecting a rotational position of the rotor of the brushless motor, thereby generating a position signal. An energization signal forming element is provided for forming a substantially sinusoidal wave energization signal on the basis of the position signal generated by the rotor position detector. A motor energizing element is provided for energizing the brushless motor on the basis of the energization signal formed by the energization signal forming element.

According to the above-described arrangement, the substantially sinusoidal energization signal is formed on the basis of the position signal and supplied to the brushless motor for energization thereof. Consequently, since the variations in the torque of the brushless motor is reduced, the vibration and noise due to operation thereof can be reduced.

In another form, an electrical angle detector is provided for detecting an electrical angle of the rotor on the basis of the position signal generated by the rotor position detector. A storing element is provided for storing data of energization waveforms according to electrical angles of the rotor. The energization signal forming element reads out, from the storage element, the data of energization waveform corresponding to the electrical angle of the rotor detected by the electrical angle detector thereby forming an energization signal. A phase command forming element is provided for forming a phase command. A voltage command forming element is provided for forming a voltage command. In this case, the energization signal forming element determines an electrical angle of the energization waveform on the basis of the electrical angle detected by the electrical angle detector and the phase command formed by the phase command forming element, thereby forming the energization signal corresponding to the determined electrical angle on the basis of the data of the energization waveform read out from the storage element and the voltage command formed by the voltage command forming element. In this arrangement, the storage element stores experimentally obtained data of energization waveforms reducing the torque variations. The data of energization waveform corresponding to the detected electrical angle is read out from the storage element. The energization signal is formed on the basis of the data of energization waveform read out. The brushless motor is controlled on the basis of the formed energization signal, whereupon the torque variations can be reduced. The above described arrangement may further include a voltage detector for detecting a dc power supply voltage. In this case, the energization signal forming element determines an electrical angle of the energization waveform on the basis of the electrical angle detected by the electrical angle detector and the phase command formed by the phase command forming element, thereby forming the energization signal corresponding to the determined electrical angle on the basis of the data of the energization waveform read out from the storage element, the voltage command formed by the voltage command forming element and the dc power supply voltage detected by the voltage detector.

The energization waveforms the data of which is stored by the storage element are preferably substantially sinusoidal. The brushless motor is preferably a polyphase motor and the energization signal forming element preferably forms the energization signal in a washing operation so that the brushless motor is energized so that a current flowing in each phase winding of the brushless motor is in phase with a voltage induced in each phase winding of the brushless motor. Furthermore, the washing machine preferably further comprises another storing element for storing data of a plurality of washing operation patterns including respective phase command patterns. In this arrangement, the energization signal forming element selects the phase command pattern simultaneously with selection of the washing operation pattern so that the brushless motor is energized so that the current flowing in each phase winding of the brushless motor is in phase with the voltage induced in each phase winding of the brushless motor.

The energization signal forming element preferably forms the motor energization signal in a drying operation so that the brushless motor is energized such that the current flowing in each phase winding of the brushless motor leads the voltage induced in each phase winding of the brushless motor. In this arrangement, the washing machine preferably further comprises another storing element for storing data of a plurality of drying operation patterns including respective phase command patterns. In this case, the energization signal forming element selects the phase command pattern simultaneously with selection of the drying operation pattern so that the brushless motor is energized so that the current flowing in each phase winding of the brushless motor leads the voltage induced in each phase winding of the brushless motor. Furthermore, the energization signal forming element preferably forms the energization signal in a braking operation so that the brushless motor is energized so that the current flowing in each phase winding of the brushless motor lags behind the voltage induced in each phase winding of the brushless motor.

The rotor position detector preferably generates as the position signal a signal having a predetermined phase relation to the voltage induced in each phase winding, and the electrical angle detector preferably detects the electrical angle of the rotor in a period shorter than a change period of the position signal generated by the rotor position detector. In this case, the electrical angle detector preferably comprises a multiplied signal generating element for generating a signal obtained by multiplying the position signal generated by the rotor position detector and a counter for counting the multiplied signal generated by the multiplied signal generator. The multiplied signal generating means includes a first counter counting a predetermined number of clock signals to thereby measure the change period of the position signal and a second counter counting clock signals the number of which is N-times larger than the predetermined number of clock signals, on the basis of results of measurement of the change period of the position signal. In this arrangement, the washing machine preferably further comprises rotational period detector for detecting a rotational period per revolution of the brushless motor. In this case, the multiplied signal generator means changes a multiplier of the multiplied signal on the basis of the rotational period detected by the rotational period detector.

The washing machine preferably further comprises a rotational stability determining element for determining stability of rotation of the brushless motor, an electrical angle data operation element which obtains an electrical angle data of the rotor corresponding to variations in the position signals on the basis of results of a plurality of times of measurement performed by the first counter, when the rotational stability determining element determines that rotation of the motor is stable, a storage element for storing data of the results of calculation performed by the electrical angle data operation element, and an element for estimating a position of the rotor in a period shorter than the change period of the position signal measured by the first counter on the basis of the data of electrical angle stored by the storage element. Furthermore, the washing machine preferably further comprises a rotational stability determining element for determining stability of rotation of the brushless motor, an electrical angle data operation element for obtaining by operation an electrical angle data of the rotor corresponding to variations in the position signals on the basis of results of a plurality of times of measurement performed by the first counter, when the rotational stability determining element determines that rotation of the motor is stable, storage element for storing data of the results of calculation performed by the electrical angle data operation element, and an apparatus for compensating the results of measurement of the first counter on the basis of the data of electrical angle stored by the storage element. In this arrangement, when the rotational period detected by the rotational period detector continuously belongs to a predetermined range, the rotational stability determining element determines that the rotation is stable.

The washing machine preferably further comprises a switch for switching a voltage supplied to the brushless motor between a rectangular wave voltage formed by logical operation of the position signal generated by the rotor position detector, the rectangular wave voltage being supplied to the brushless motor to start the same, and a voltage based on the energization signal formed by the energization signal forming element and supplied to the brushless motor subsequently to starting thereof. Furthermore, the electrical angle detector, the storage element and the energization signal forming means are preferably composed into a one-chip microcomputer.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 11 shows determination data in a position signal mode;

FIG. 12 shows data of electrical angles;

FIG. 13 shows data of rectangular wave signals;

FIGS. 14A to 14C illustrate an example of the dehydrating operation pattern;

FIGS. 19A to 19K are time charts showing a control manner of starting the motor or of rectangular wave energization;

FIGS. 20A to 20J are time charts showing a control manner when the motor is supplied with a sinusoidal wave voltage;

FIG. 27 illustrates a data table for determining a rotational speed region;

FIG. 28 illustrates a data table for determining a multiplication factor;

FIG. 29 illustrates a data table of electrical angles;

DETAILED DESCRIPTION OF THE PREFERRED EMBODIMENTS

Figure 1:
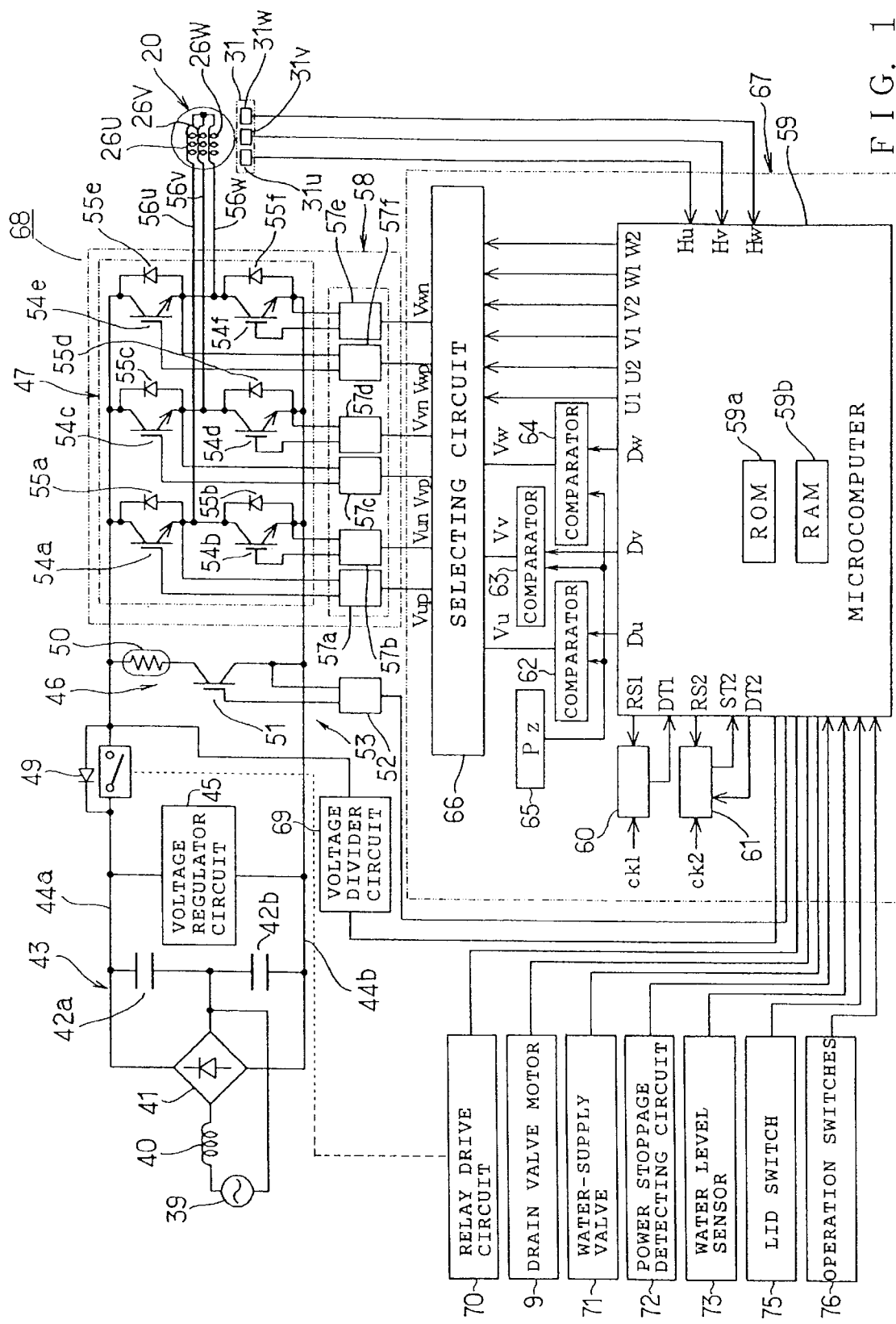
FIG. 1 is an electrical diagram showing an electrical arrangement of a full automatic washing machine of a first embodiment in accordance with the present invention.
Figure 2:
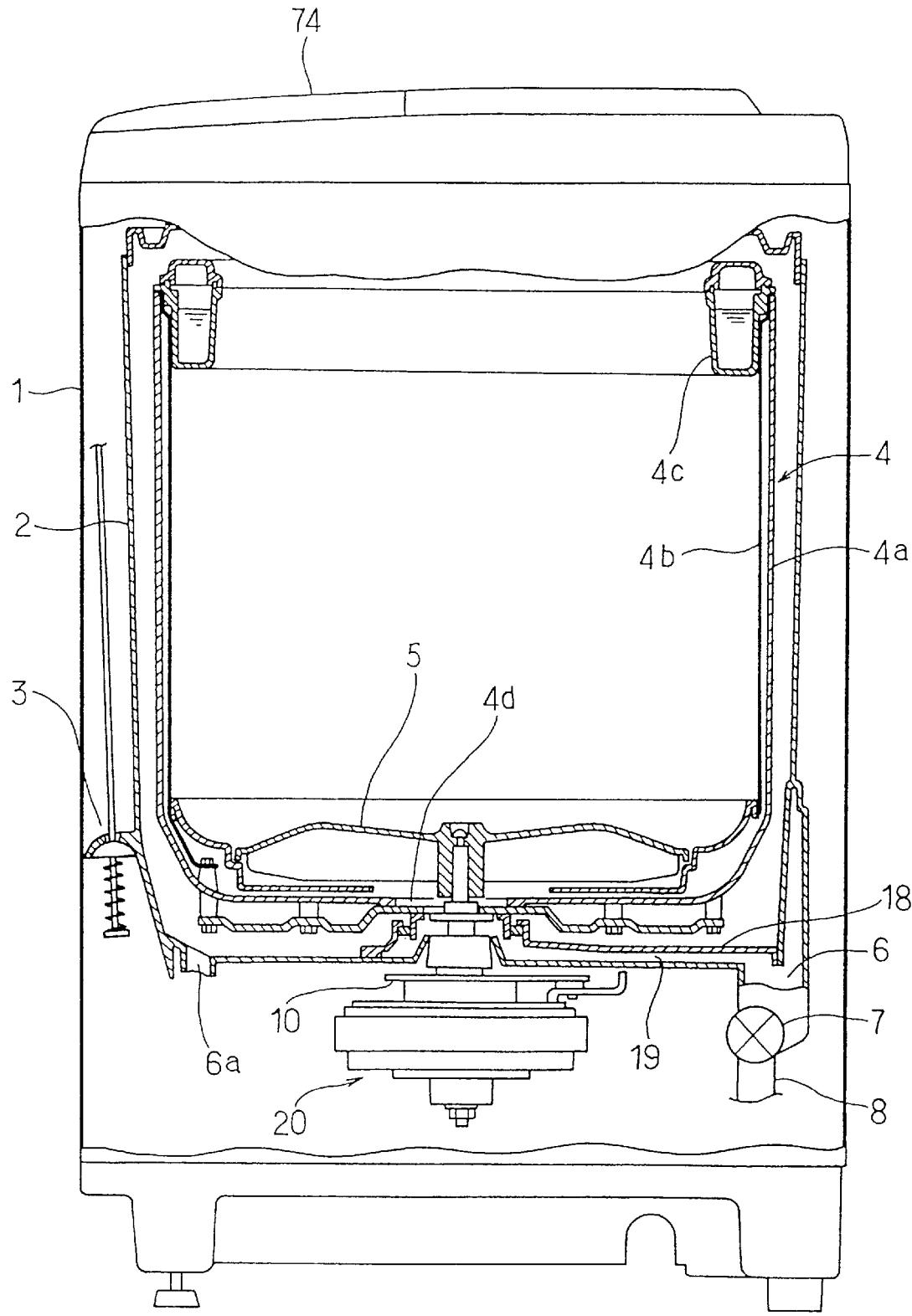
FIG. 2 is a longitudinal side section of the full automatic washing machine.

A first embodiment of the present invention will be described with reference to FIGS. 1 to 24B. Referring first to FIG. 2, a full automatic washing machine of the first embodiment in accordance with the present invention is shown. An outer cabinet 1 of the washing machine encloses an outer or water-receiving tub 2 suspended on a plurality of elastic suspension mechanisms 3 only one of which is shown. The water-receiving tub 2 serves for receiving water resulting from a dehydrating operation. A rotatable tub 4 serving both as a wash tub and as a dehydration basket is rotatably mounted in the water-receiving tub 2. An agitator 5 is rotatably mounted on the bottom of the rotatable tub 4.

The rotatable tub 4 includes a generally cylindrical tub body 4a, an inner cylinder 4b provided inside the tub body 4a to define a water passing space, and a balancing ring 4c mounted on an upper end of the tub body 4a. Upon rotation of the rotatable tub 4, a resultant centrifugal force raises water therein, which is then discharged into the water-receiving tub 2 through dehydration holes (not shown) formed in the upper portion of tub 4.

A drain hole 6 is formed in the right-hand bottom of the water-receiving tub 2, as viewed in FIG. 2. A drain valve 7 is provided in the drain hole 6. A drain hose 8 is connected to the drain hole 6. The drain valve 7 is a motor operated valve closed and opened by a drain valve motor 9 (see FIG. 1) serving as drain valve driving means which will be described later. The drain valve motor 9 comprises a geared motor, for example. An auxiliary drain hole 6a is formed in the left-hand bottom of the water-receiving tub 2, as viewed in FIG. 2. The auxiliary drain hole 6a is connected through a connecting hose (not shown) to the drain hose 8. The auxiliary drain hole 6a is provided for draining water which is discharged through the dehydration holes in the upper portion of the rotatable tub 4 into the water-receiving tub 2 upon rotation of the rotatable tub 4 for the dehydrating operation.

Figure 3:
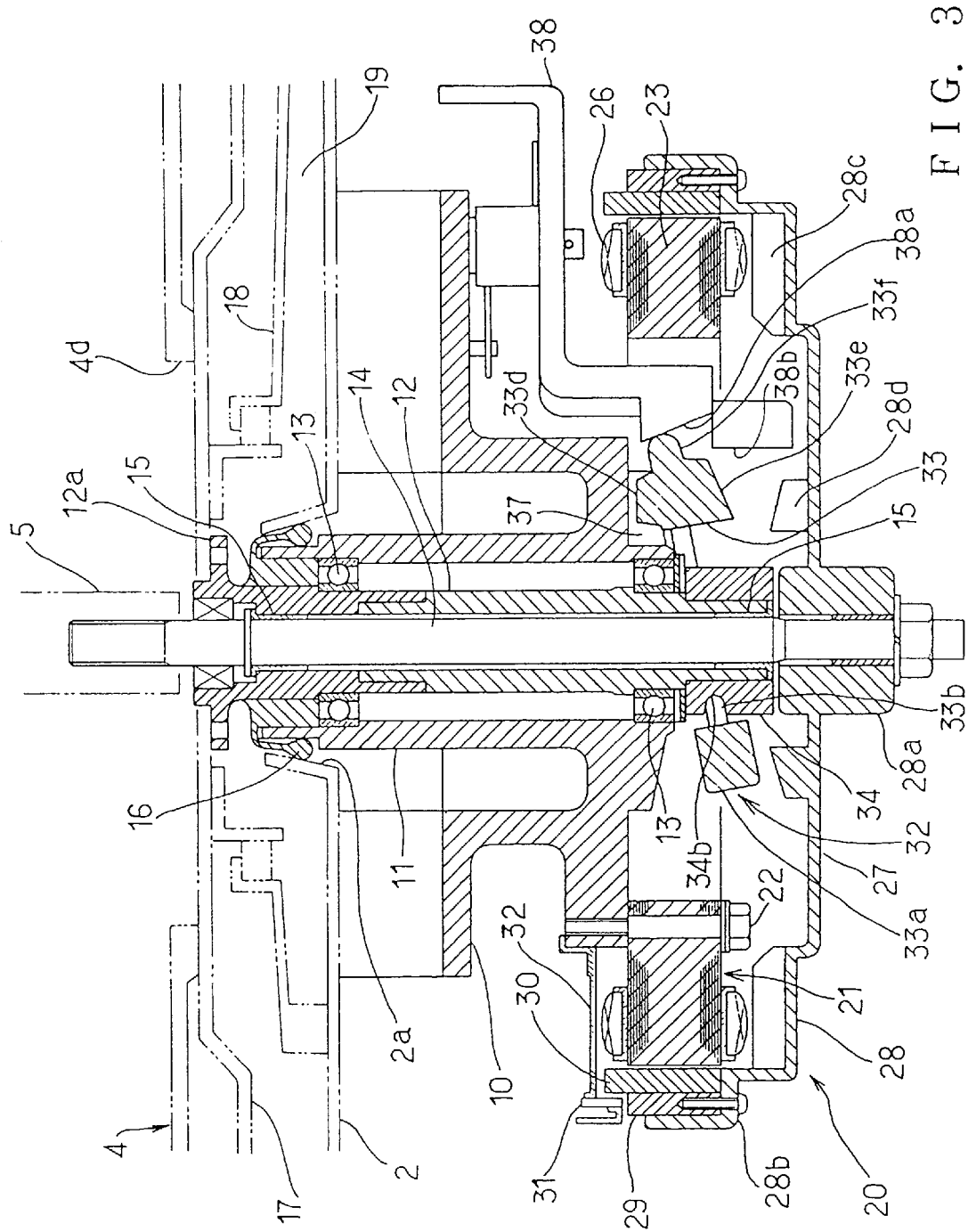
FIG. 3 is a longitudinal side section of the drive mechanism for the rotatable tub and agitator of the washing machine.

Referring to FIGS. 2 and 3, a mechanism base 10 is mounted on an outer bottom of the water-receiving tub 2. The mechanism base 10 is formed in its central portion with a vertically extending shaft support cylinder 11. A hollow tub shaft 12 is inserted in the shaft support cylinder 11 to be supported on bearing members such as ball bearings 13 for rotation. An agitator shaft 14 is inserted in the tub shaft 12 to be supported on ball bearings 15 for rotation. Upper and lower ends of the agitator shaft 14 extend out of the tub shaft 12. An upper end of the shaft support cylinder 11 is fitted into a through hole 2a formed in the central bottom of the water-receiving tub 2 with a seal 16 being interposed therebetween for watertight seal. Another seal 16 is provided between an outer circumferential surface of the tub shaft 12 and the upper end of the shaft support cylinder 11 for watertight seal therebetween. The tub shaft 12 has an integrally formed flange 12a on the upper end thereof. The rotatable tub 4 is mounted on a tub support plate 17 further fixed to the flange 12a so that the rotatable tub 4 is rotated with the tub shaft 12. The upper end of the agitator shaft 14 is fitted into the agitator 5 so that the agitator 5 is fixed by a screw to the agitator shaft 14 and so that the agitator 5 is rotated with the agitator shaft 14, as is shown in FIGS. 2 and 3.

A drain cover 18 extends between the central inner bottom of the water-receiving tub 2 and the drain hole 6 to define a draining passage 19 extending from a through hole 4d formed in the bottom of the rotatable tub 4 to the drain hole 6, as is shown in FIGS. 2 and 3. In this construction, water is stored in the rotatable tub 4 and the draining passage 19 when supplied into the tub 4 with the drain valve 8 closed. The water in the rotatable tub 4 is discharged through the hole 4d, the draining passage 19, the drain hole 6, the drain valve 7, and the drain hose 8 sequentially when the drain valve 8 is opened.

Figure 4:
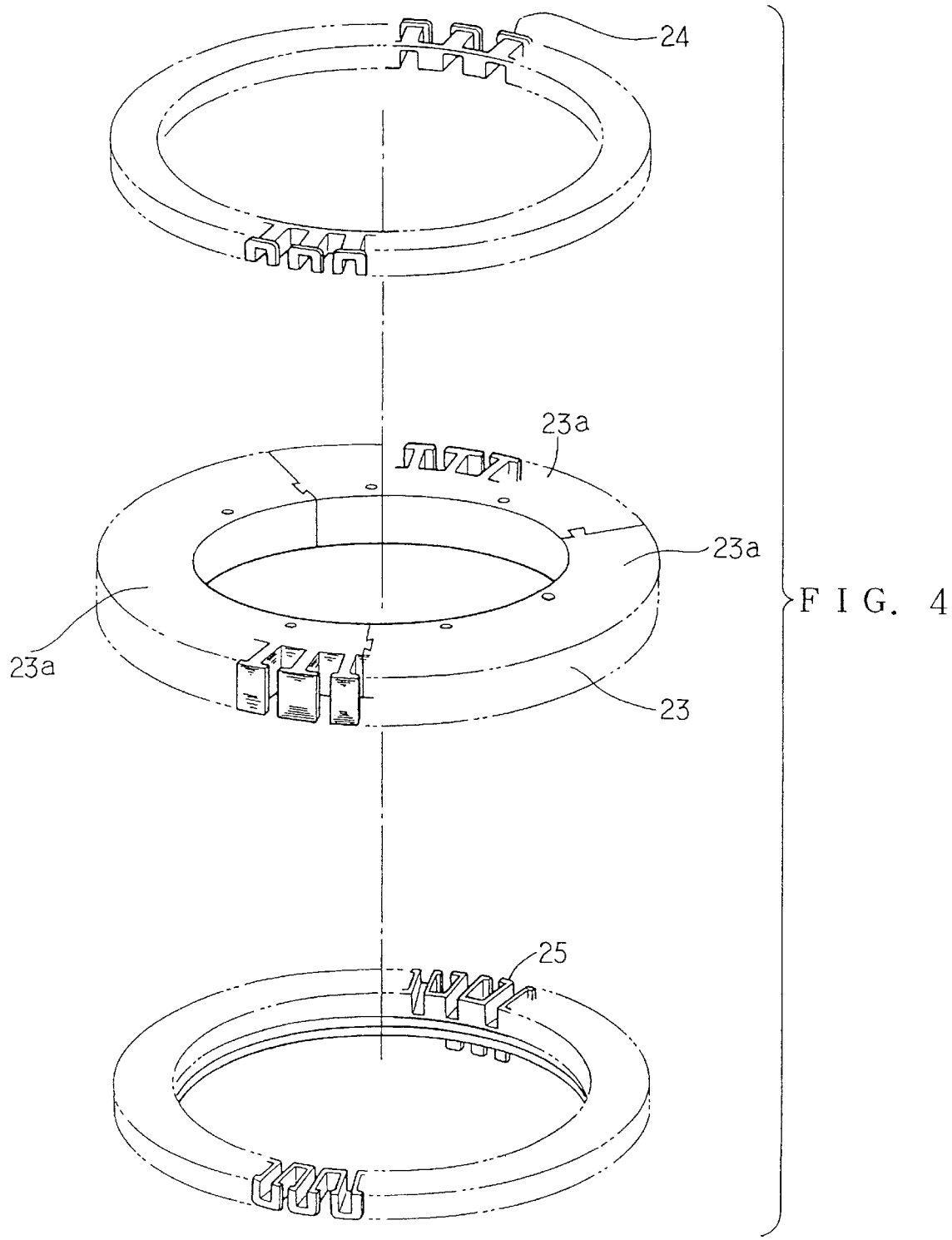
FIG. 4 is an exploded perspective view of a stator of the brushless motor used in the washing machine.

An electric motor 20 such as an outer rotor type brushless motor wherein a rotor is located outside stator coils is mounted on the mechanism base 10 further mounted on the outer bottom of the water-receiving tub 2. More specifically, a stator 21 of the motor 20 is mounted on the mechanism base 10 by stepped screws 22 to be concentric with the agitator shaft 14. The stator 21 comprises a laminated iron core 23, upper and lower bobbins 24 and 25, and a winding 26, as shown in FIG. 3. The laminated core 23 comprises three generally circular arc-shaped unit iron cores 23a connected to one another into an annular shape, as shown in FIG. 4. The upper and lower bobbins 24 and 25 are each made of a plastic and adapted to be fitted to upper and lower teeth of the laminated iron core 23 respectively. The winding 26 is wound around the outer peripheries of the bobbins 24 and 25. The winding 26 is composed of three-phase windings 26U, 26V and 26W as shown in FIG. 1.

A rotor 27 of the brushless motor 20 is mounted on the lower end of the agitator shaft 14 to be rotated therewith, as is shown in FIG. 3. The rotor 27 comprises a rotor housing 28, a rotor yoke 29, and a plurality of rotor magnets 30. The rotor housing 28 is made of aluminum by die casting and has a central boss portion 28a and an outer peripheral magnet mounting portion 28b. The lower end of the agitator shaft 14 is fitted into the boss portion 28a to be fixed in position.

Figure 5:
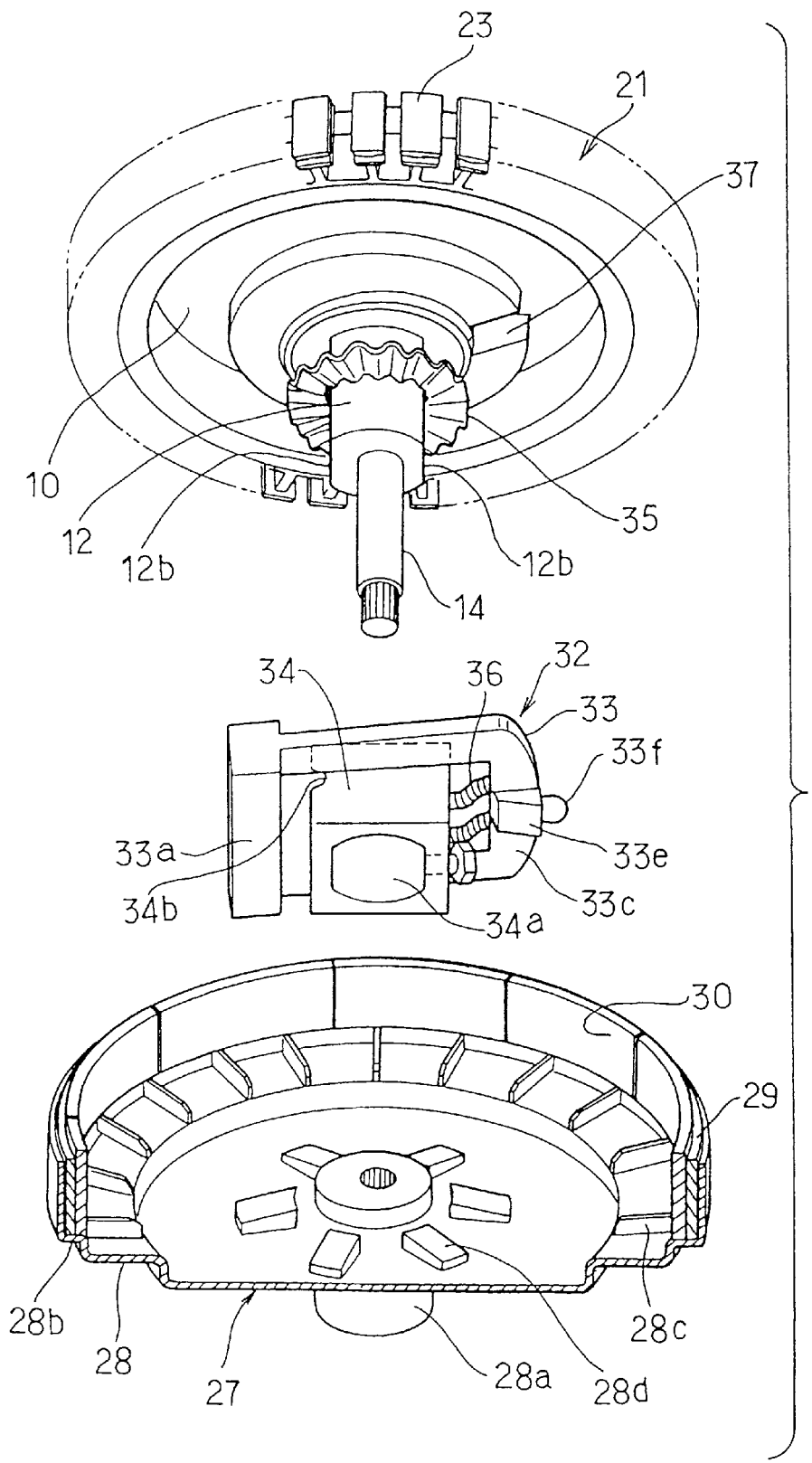
FIG. 5 is an exploded perspective view of the brushless motor and a clutch.

The magnet mounting portion 28b of the rotor housing 28 includes a horizontal portion and a vertical portion. The rotor yoke 29 is abutted against an inner surface of the vertical portion of the magnet mounting portion 28b and further fixed by screws to the horizontal portion of the magnet mounting portion 28b. The rotor magnets 30 are bonded to an inner surface of the rotor yoke 29, for example. The rotor housing 28 has a number of radially extending ribs 28c formed on an upper circumferential surface thereof opposed to the winding 26 of the stator 21, as shown in FIGS. 3 and 5. The rotor housing 28 further has a plurality of convex portions 28d formed on the central bottom thereof to radially protrude about its axis. These convex portions 28d constitute an engaged portion.

Three Hall ICs (magnetic detecting elements) 31 are mounted on respective fixtures 32 which are further fixed to the outer periphery of the mechanism base 10. One of the three Hall ICs 31 is shown in FIG. 3. The Hall ICs 31 serve as rotor position detecting means for detecting a rotational position of the rotor magnets 30 of the rotor 27. The Hall ICs 31 are those 31u, 31v and 31w disposed at intervals of electrical angle of 120 degrees, as shown in FIG. 1.

A clutch 32 is provided on the lower end of the tub shaft 12. The clutch 32 has a function of changing between a first mode in which the tub shaft 12 is operatively coupled to the agitator shaft 14 in a dehydrating operation so that the rotor 27, the agitator shaft 14 and the tub shaft 12 are rotated together, and a second mode in which the tub shaft 12 is decoupled from the agitator shaft 14 in a washing operation so that the tub shaft 12 is prevented from being rotated with the rotor 27 and the agitator shaft 14.

Figure 6:
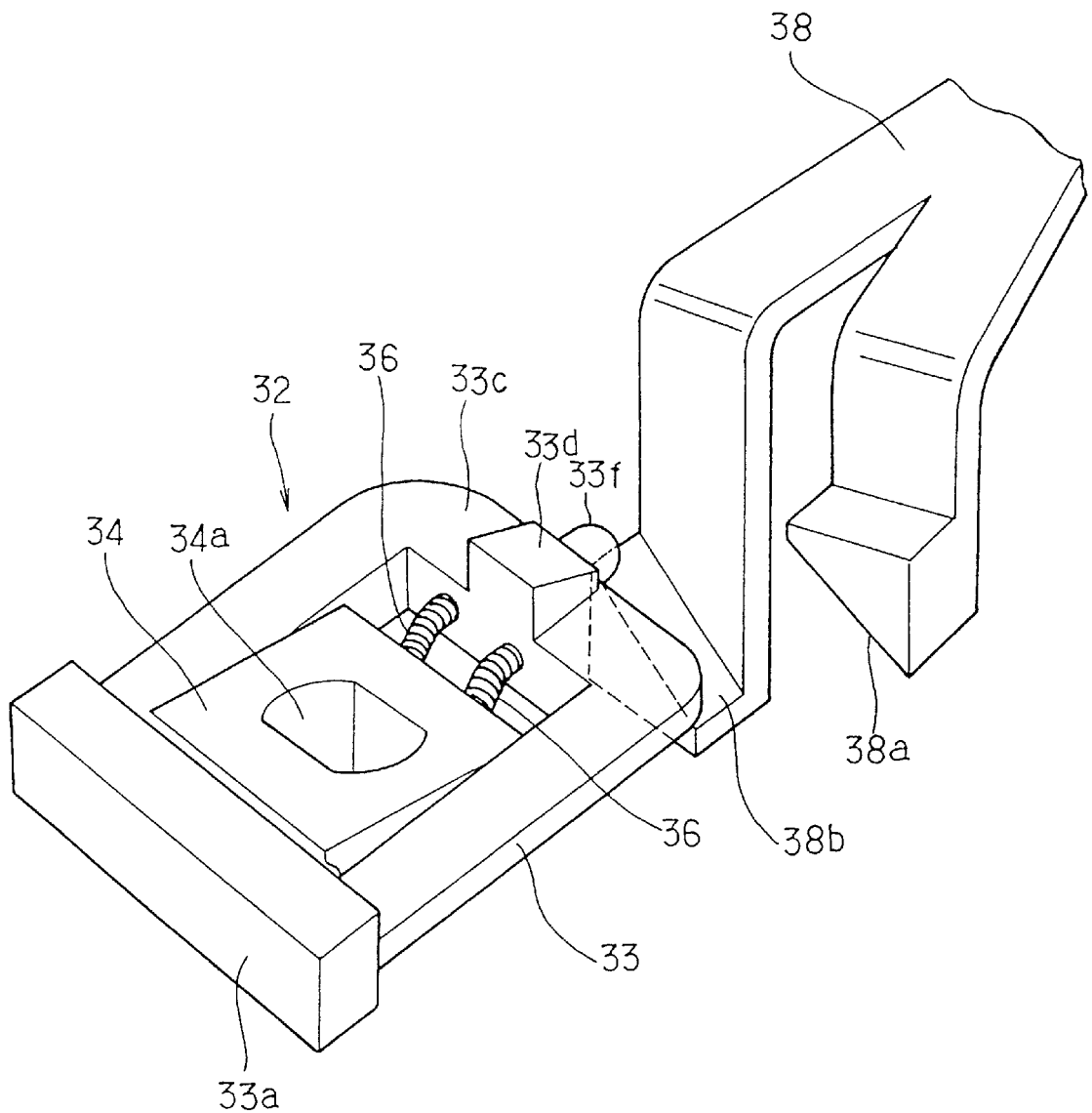
FIG. 6 is a perspective view of the clutch and a control lever.

The clutch 32 will be described in detail. Referring to FIG. 6, the clutch 30 comprises a generally rectangular frame-shaped change-over lever 33 and a holder 34 provided inside the lever 33. The holder 34 is mounted on the lower end of the tub shaft 12 to be rotated together. More specifically, the tub shaft 12 has a pair of flat faces 12b formed on a lower outer circumferential surface thereof to be opposed to each other, as shown in FIG. 5. The holder 34 has a central fitting hole 34a having flat inner surfaces against which the flat faces 12b of the tub shaft 12 are abutted. The holder 34 further has a pivot concave portion 34b formed in the left-hand outer surface thereof to have an approximately semicircular section, as viewed in FIG. 5. The lower end of the tub shaft 12 is fitted into the fitting hole 34a of the holder 34 and then fixed by screws (not shown) so that the holder 34 is fixed to the tub shaft 12. Furthermore, a corrugated washer 35 is provided between the holder 34 and the lower bearing 13, for example. The corrugated washer 35 is adapted to press the lower bearing 13 upward.

The change-over lever 33 is fitted into the holder 34 so as to be rotated with the holder 34 and the tub shaft 12, as is shown in FIGS. 5 and 6. The change-over lever 33 has in the inside of one end 33a thereof (a left-hand end in FIG. 5) a pivot convex portion 33b (see FIG. 3) having an approximately semicircular section. The pivot convex portion 33b is fitted into the pivot concave portion 34b of the holder 34 so that the change-over lever 33 is pivotable or rotatable upward and downward about the portion 33b. Furthermore, two toggle type springs 36 each comprising a compression coil spring are provided between the change-over lever 33 and the holder 34, as are shown in FIGS. 5 and 6. The toggle type springs 36 hold the change-over lever 33 at an upper position (see FIG. 1) when the same is rotated upward and at a lower position (see FIG. 7) when the same is rotated downward. The change-over lever 33 has convex portions 33d and 33e formed on the upper and lower portions of an end 33c thereof (a right-hand end as viewed in FIGS. 5 and 6) respectively and an operated portion 33f protruding from an outside surface of the end 33c.

A recess 37 is formed in the underside of the mechanism base 10 serving as a stationary portion so as to be opposed to the upper convex portion 33d of the change-over lever 33, as shown in FIGS. 3 and 5. On one hand, the upper convex portion 33d of the change-over lever 33 is fitted into the recess 37 when the change-over lever 33 is rotated upward, as shown in FIG. 1 showing the condition in the washing operation. Consequently, the tub shaft 12 and accordingly, the rotatable tub 4 are fixed to the mechanism base 10 serving as the stationary portion. The tub shaft 12 is thus decoupled from the agitator shaft 14 so as not to be co-rotated with the latter and the motor rotor 27 when the upper convex portion 33d has been fitted in the recess 37. The agitator shaft 14 and the motor rotor 27 are originally coupled to each other to be rotated together.

Figure 7:
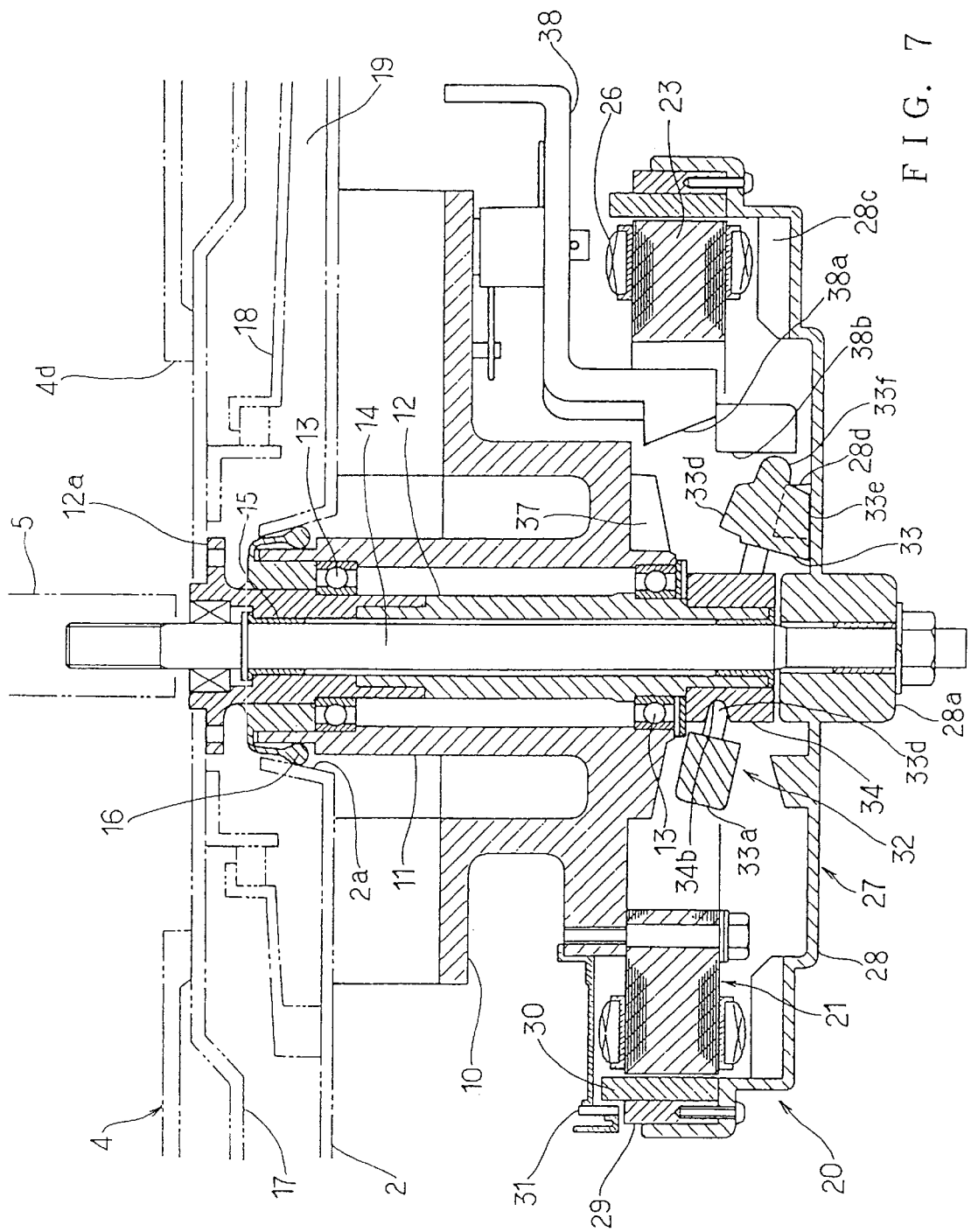
FIG. 7 is a view similar to FIG. 3, showing a condition of the clutch differing from that in FIG. 3.

On the other hand, the lower convex portion 33e of the change-over lever 33 is engaged with two of the convex portions 28d on the upper face of the rotor housing 28 when the change-over lever 33 is rotated downward, as is shown in FIG. 7 showing the condition in the dehydrating operation. Consequently, the tub shaft 12 is co-rotated with the motor rotor 27 and the agitator shaft 14. In this condition, the tub shaft 12, the rotatable tub 4, the agitator shaft 14 and the agitator 5 are directly driven by the brushless motor 20. Thus, the brushless motor 20 directly drives only the agitator 5 or both of the agitator 5 and rotatable tub 4 together.

A control lever 38 is mounted at its one end on the right-hand end of the mechanism base 10 to be pivotable, as viewed in FIG. 3. The control lever 38 has bifurcated portions at the other end thereof, as is shown in FIG. 6. One of the bifurcated portions of the lever 38, which is a right-hand one in FIG. 6, has a downwardly inclined surface 38a on its distal end, whereas the other bifurcated portion thereof, which is a left-hand one in FIG. 6, has an upwardly inclined surface 38b on its distal end. The operated portion 33f of the change-over lever 33 of the clutch 32 is pushed downward by the downwardly inclined surface 38a of the control lever 38 when the drain valve motor 9 driving the drain valve 7 causes the control lever 38 to pivot in a direction. Consequently, the change-over lever 33 is rotated downward into the condition of FIG. 7 during the dehydrating operation with the drain valve 7 being opened.

A return spring (not shown) of the drain valve 7 causes the control lever 38 to pivot in the opposite direction when the drain valve motor 9 is deenergized under the condition as shown in FIG. 7. Consequently, the operated portion 33f of the change-over lever 33 is upwardly pushed by the upwardly inclined surface 38b of the control lever 38 such that the change-over lever 33 is rotated upward into the condition of FIG. 3 during the washing operation with the drain valve 7 being closed.

An electrical arrangement of the washing machine will be described with reference to FIG. 1. One of two terminals of a commercial ac power supply 39 is connected through a reactor 40 to an input terminal of a full-wave rectifier circuit 41. The other terminal of the power supply 39 is connected directly to another input terminal of the full-wave rectifier circuit 41. Smoothing capacitors 42a and 42b are connected between output terminals of the full-wave rectifier circuit 41. A dc power supply circuit 43 is composed of the full-wave rectifier circuit 41 and the smoothing capacitors 42a and 42b. DC bus bars 44a and 44b extend from output terminals of the dc power supply circuit 43 respectively. A voltage regulator circuit 45, a discharge circuit 46 and an inverter main circuit 47 are connected between the bus bars 44a and 44b. A relay 48 and a diode 49 having the polarity as shown in the circuit diagram of FIG. 1 are connected in parallel with each other across the bus bar 44a between the voltage regulator circuit 45 and the discharge circuit 46. The discharge circuit 46 is composed of a series connection of a discharge resistance 50 such as an insulated gate bipolar transistor (IGBT) and a switching element 51. The switching element 51 has a control terminal (gate terminal) connected to a drive circuit 52 comprising a photo-coupler, for example. The discharge circuit 46 and the drive circuit 52 constitute discharging means.

The inverter main circuit 47 comprises three-phase bridge-connected switching elements 54a to 54f comprising respective IGBTs and flywheel diodes 55a to 55f connected in parallel to the respective switching elements 54a to 54f. The inverter main circuit 47 has output terminals 56u, 56v and 56w connected to the three-phase windings 26U, 26V and 26W of the brushless motor 20 respectively. Control terminals (gates) of the switching elements 54a to 54f of the inverter main circuit 47 are connected to drive circuits 57a to 57f comprising photo-couplers, for example, respectively. The inverter main circuit 47 and the drive circuits 57a to 57f constitute motor energizing means 58.

The three Hall ICs 31u, 31v and 31w of the brushless motor 20 detect the rotational position of the rotor magnet 30 of the rotor 27, thereby generating position signals Hu, Hv and Hw respectively. The position signals Hu, Hv and Hw are supplied to a microcomputer 59 having a function of controlling the brushless motor 20 and a function of controlling the entire operation of the washing machine. The microcomputer 59 incorporates a read only memory (ROM) 59a for storing data of a control program and data necessary for execution of the control program. The latter data includes data of energization waveforms as will be described in detail later. The microcomputer 59 further incorporates a random access memory (RAM) 59b serving as a working storage. The microcomputer 59 serves as electrical angle detecting means, storing means, phase command forming means and voltage command forming means as will be described in detail later.

Two 16 bit counters 60 and 61 are connected to the microcomputer 59. The first counter 60 receives a reset signal RS1 from the microcomputer 59 to count clock signals ck1 of 125 KHz, for example. The first counter 60 delivers the result of the counting or count data DT1 to the microcomputer 59. The second counter 61 receives a reset signal RS2 from the microcomputer 59 to count clock signals ck2 of 1 MHz eight times higher than the frequency of the clock signals ck1. The second counter 61 delivers to the microcomputer 59 a signal ST2 which is a coincidence signal when an obtained count coincides with data DT2 supplied thereto from the microcomputer 59. The data DT2 will be described in detail later.

The microcomputer 59 forms, for example, 8 bit output waveform data Du, Dv and Dw as will be described in detail later and delivers these data to three comparators 62, 63 and 64 respectively. The comparators 62, 63 and 64 compare the respective output waveform data Du, Dv and Dw supplied from the microcomputer 59 with, for example, 8 bit output data Pz delivered from a triangular wave generating circuit 65. The comparators 62, 63 and 64 deliver high level output signals Vu, Vv and Vw when the output waveform data Du, Dv and Dw are larger than the output data Pz, respectively. The comparators 62, 63 and 64 deliver low level output signals Vu, Vv and Vw when the output waveform data Du, Dv and Dw are equal to or smaller than the output data Pz, respectively. These high-level and low-level output signals Vu, Vv and Vw are delivered to a selecting circuit 66. The above-described triangular wave generating circuit 65 is provided for generating carrier waves Pz composed of digital triangular waves, that is, the 8 bit output data Pz.

Figure 8:
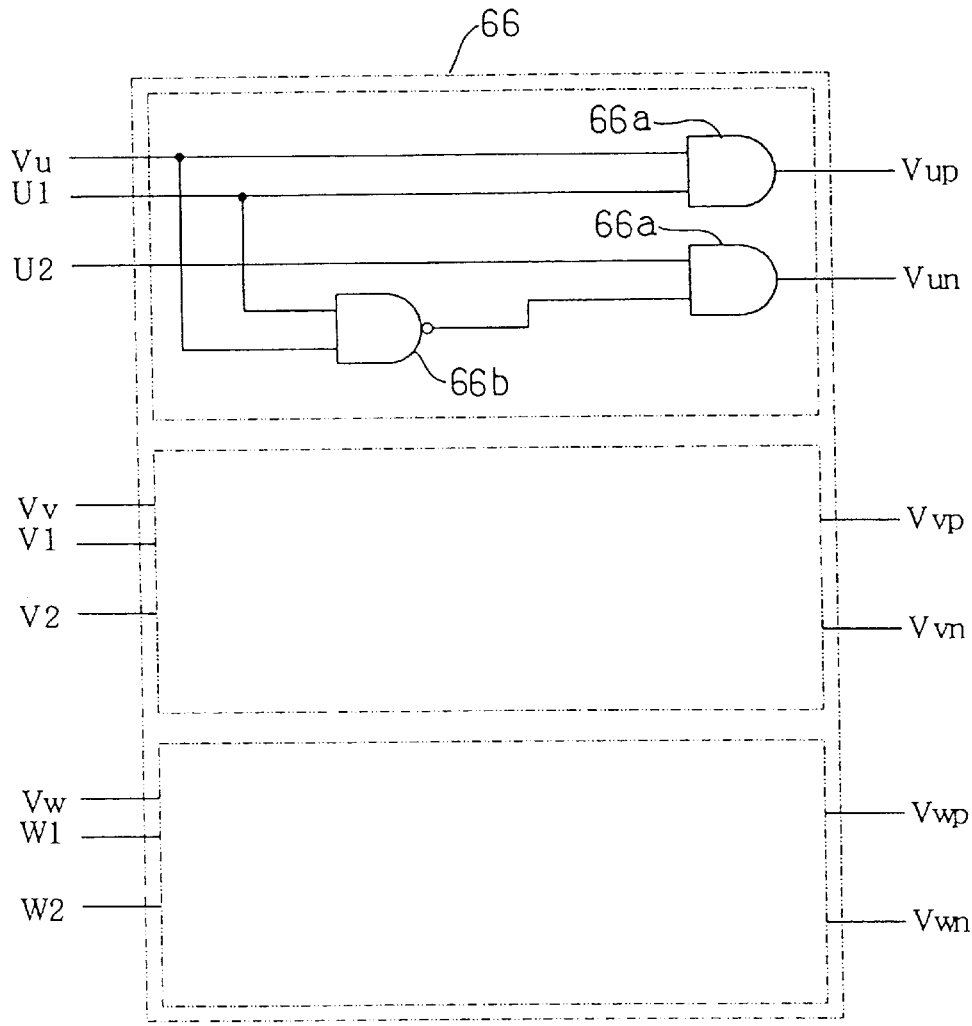
FIG. 8 illustrates an electrical arrangement of a selecting circuit.

The microcomputer 59 further forms selection signals U1, U2, V1, V2, W1 and W2 in a manner as will be described in detail later. The formed selection signals U1, U2, V1, V2, W1 and W2 are delivered to the selecting circuit 66. Based on the above-described output signals Vu, Vv and Vw and selection signals U1, U2, V1, V2, W1 and W2, the selecting circuit 66 generates drive signals Vup, Vun, Vvp, Vvn, Vwp and Vwn, which are delivered to the respective drive circuits 57a to 57f. The selecting circuit 66 comprises two AND circuits 66a and a NAND circuit 66b with respect to phase U as shown in FIG. 8. The selecting circuit 66 has the same circuit arrangement as shown in FIG. 8 with respect to each of the other phases V and W though the circuit arrangements for phases V and W are not shown.

Control means 67 is constituted by the microcomputer 59, counters 60 and 61, comparators 62, 63 and 64, triangular wave generating circuit 65 and selecting circuit 66. The control means 67 constitutes energization signal forming means. Furthermore, an inverter device 68 is constituted by the control means 67, motor energizing means 58, discharge means 53 and dc power supply circuit 43.

The microcomputer 59 detects a voltage value at the dc bus bar 44a via a voltage divider circuit 69. A voltage signal generated by the voltage divider circuit 69 is delivered to an input terminal of the microcomputer 59 having an analog-to-digital (A/D) conversion function. The microcomputer 59 controls a relay drive circuit 70 via the relay 48. The microcomputer 59 further controls the drain valve motor 9 for driving the drain valve 7 and a water-supply valve 71 for supplying water to the rotatable tub 4. Furthermore, the microcomputer 59 is supplied with a power stoppage signal from a power stoppage detecting circuit 72 for detecting power stoppage on the basis of the voltage at the ac power supply 39, a water level signal from a water level sensor 73 for detecting a water level in the rotatable tub 4, a lid signal from a lid switch 75 for detecting closure and opening of a lid 74 mounted on the top of the outer cabinet 1, and switch signals from various operation switches 76 provided in an operation panel (not shown).

Figure 15A:
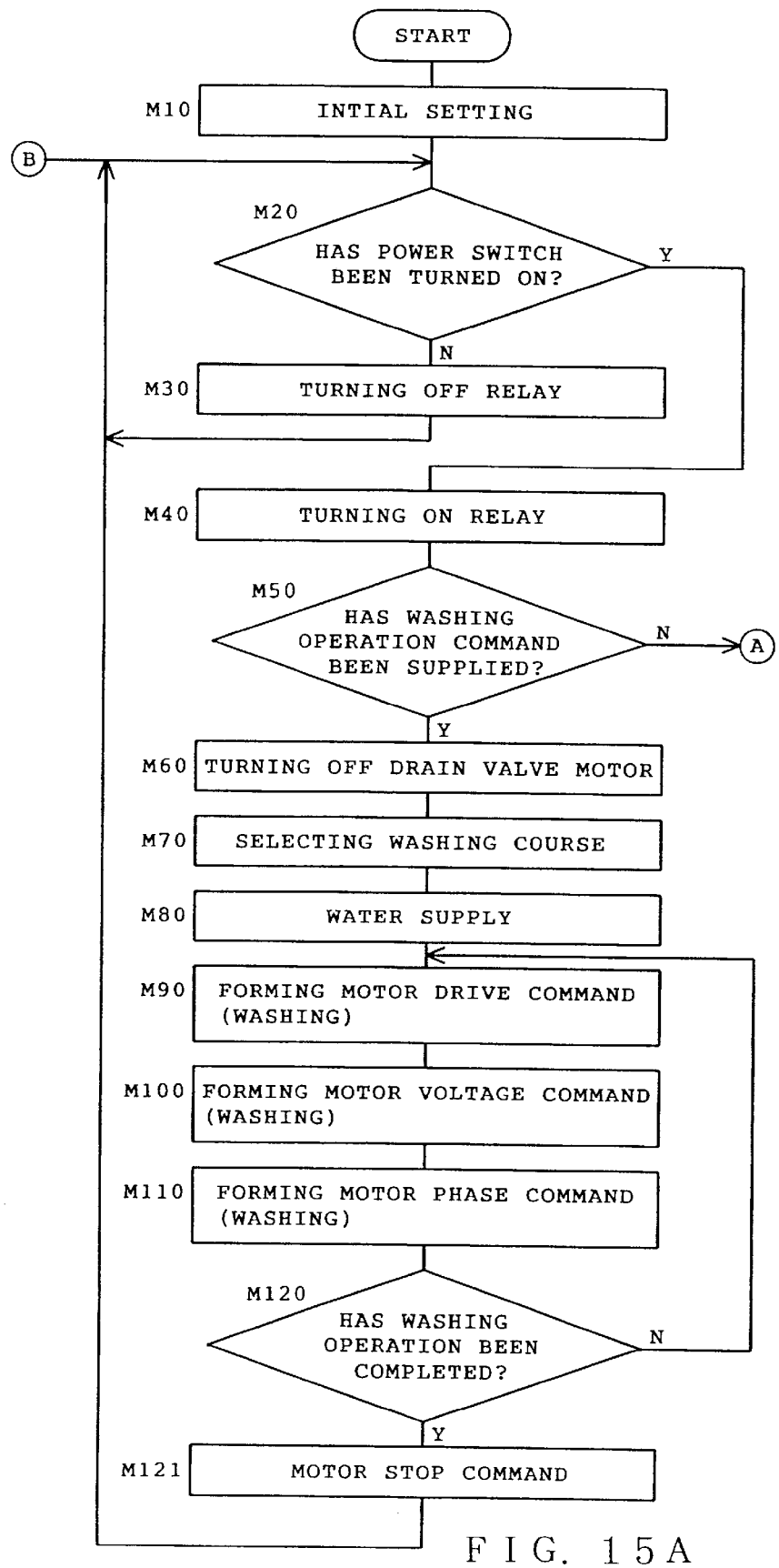
FIGS. 15A and 15B are flowcharts showing the main processing.
Figure 15B:
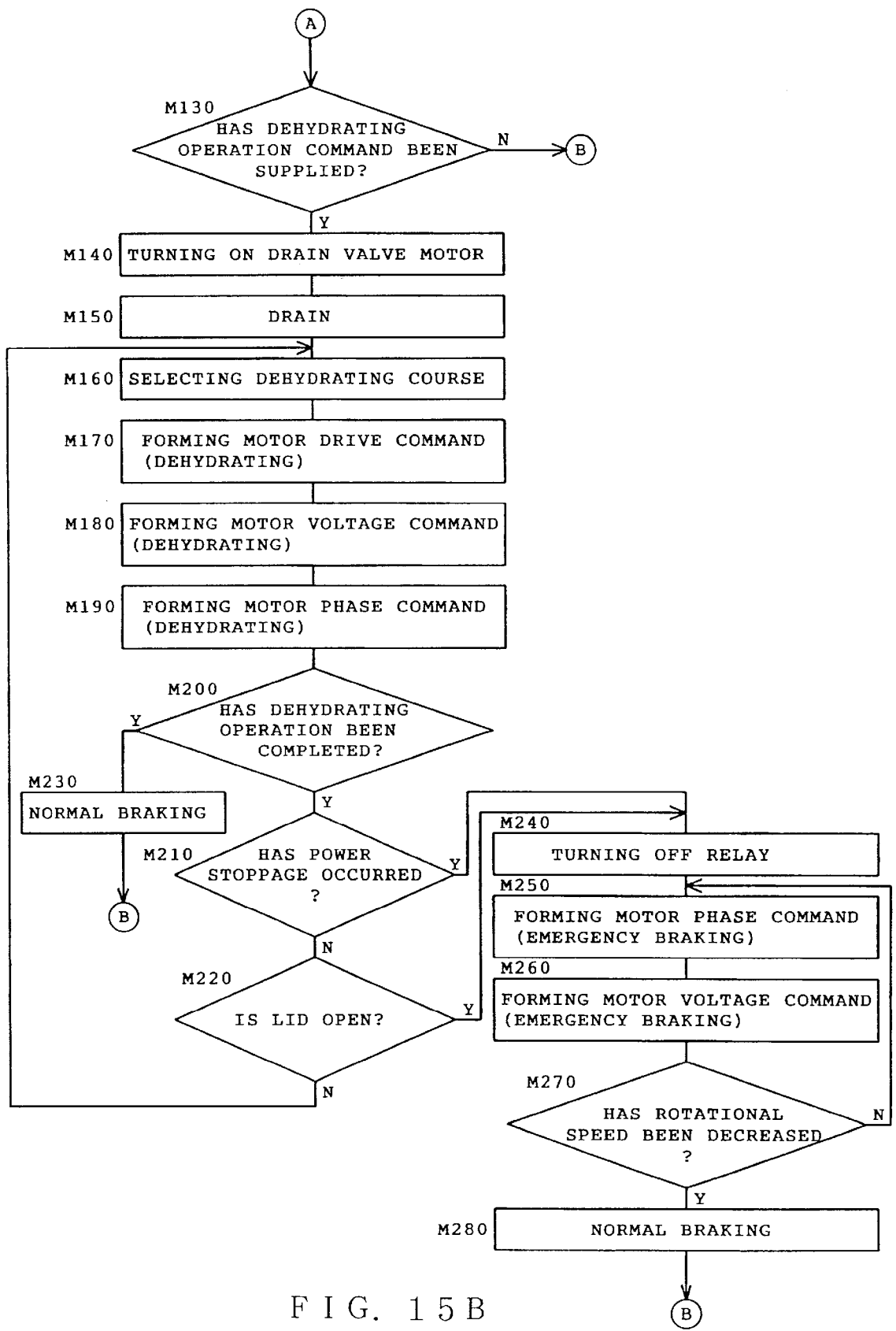
Figure 16:
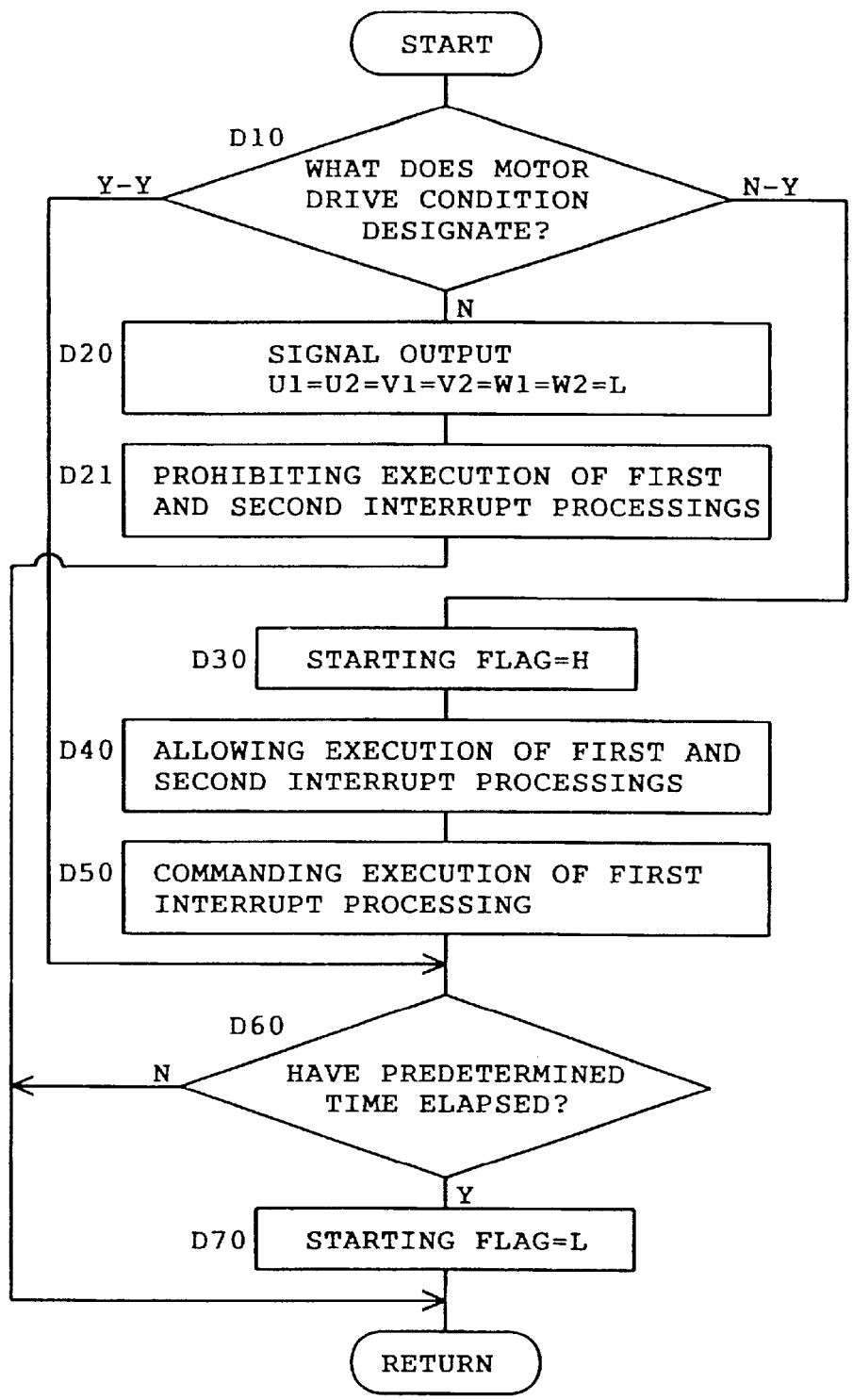
FIG. 16 is a flowchart showing the main processing for driving the motor.
Figure 17:
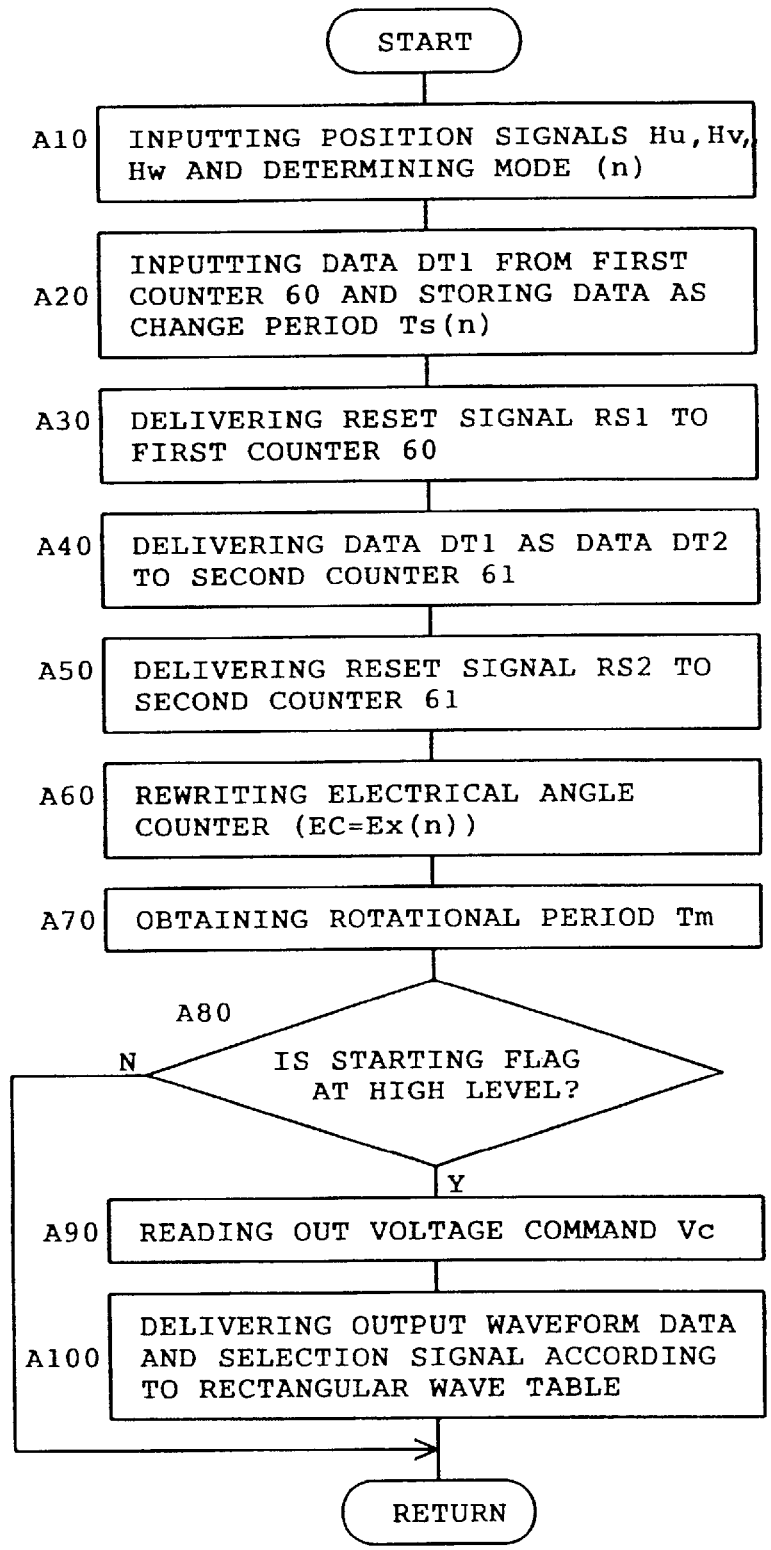
FIG. 17 is a flowchart showing a first interrupt processing.
Figure 18:
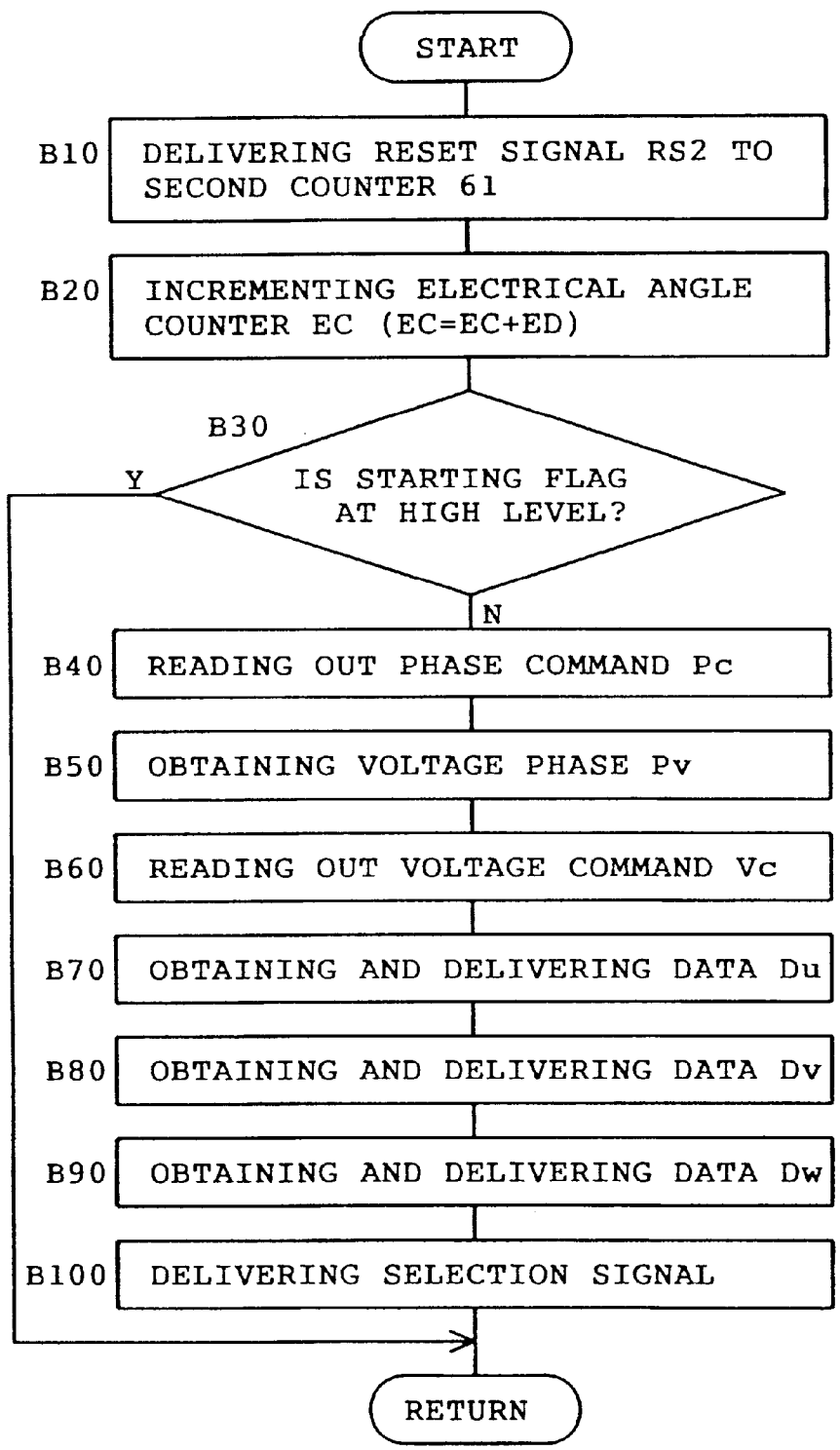
FIG. 18 is a flowchart showing a second interrupt processing.

The operation of the washing machine will now be described. Control manners for the washing and dehydrating operations will be described with reference to FIGS. 9 to 24B. FIGS. 15A to 18 are flowcharts showing control contents of the control program stored in the microcomputer 59. FIGS. 15A and 15B show the control contents of a main processing for each of the washing and dehydrating operations. FIG. 16 shows the control contents of a main processing for driving the motor. FIG. 17 shows the control contents of a first interrupt processing. FIG. 18 shows the control contents of a second interrupt processing.

The control for the washing operation will first be described. Referring first to FIG. 15A, the microcomputer 59 executes an initial setting at step M10 when connected to the commercial ac power supply 39. RAM 59b is initialized and various output terminals are set at respective initial values. The microcomputer 59 then determines whether a power switch, which is one of the operation switches 76, is turned on, at step M20. The microcomputer 59 determines in the negative when the power switch is turned off, delivering an OFF signal to the relay drive circuit 70 to thereby turn off the relay 48, at step M30. The microcomputer 59 then returns to step M20. When the power switch is turned on, the microcomputer 59 determines in the affirmative at step M20, delivering an ON signal to the relay drive circuit 70 to thereby turn on the relay 48 at step M40.

The microcomputer 59 then determines whether a washing operation command has been delivered, at step M50. The determination is based on operations of the various operation switches 76. The microcomputer 59 determines in the affirmative at step M50 to deliver a signal turning off the drain valve motor 9 (step M60) when the washing operation command has been delivered. Consequently, the drain valve motor 9 is turned off and the drain valve 7 is closed. Furthermore, the change-over lever 33 of the clutch 32 is rotated upward so that the tub shaft 12 and the rotatable tub 4 are engaged with the mechanism base 10 serving as the stationary member, as shown in FIG. 3. The microcomputer 59 then advances to step M70 where one of a plurality of washing courses is selected to be set. Selection of the one washing course is based on the results of operation of the operation switches 76. The microcomputer 59 then advances to step M80 for execution of processing to supply water to the rotatable tub 4. More specifically, the water-supply valve 71 is energized to be opened so that water supply to the rotatable tub 4 is initiated. The water-supply valve 71 is deenergized to be closed when the water-level sensor 73 detects attainment of the water in the tub 4 to a level corresponding to the selected washing course.

The microcomputer 59 then executes a sequential processing at steps M90, M100 and M110 to thereby form an operation pattern (operation command) for the brushless motor 20. More specifically, ROM 59a stores data of a plurality of washing operation patterns. The microcomputer 59 reads out one of the washing operation patterns corresponding to the selected washing course, forming a washing operation pattern. FIGS. 10A to 10C show such a washing operation pattern.

The washing operation pattern is constituted by a drive command comprising 2 bit data, for example, a voltage command Vc comprising 8 bit data, for example, and a phase command Pc comprising 9 bit data, for example. The drive command is data for DRIVE/STOP and FORWARD/REVERSE of the brushless motor 20. DRIVE is represented by the low order bit when it is "1." STOP is represented by the low order bit when it is "0." FORWARD is represented by the high order bit when it is "1." REVERSE is represented by the high order bit when it is "0." The voltage command Vc represents a voltage applied to the brushless motor 20. The phase command Pc represents a voltage phase relative to a rotor phase.

The washing operation pattern as shown in FIGS. 10A–10C is executed in a cycle of four seconds and contains FORWARD DRIVE for 1.5 sec., STOP for 0.5 sec., REVERSE DRIVE for 1.5 sec. and STOP for 0.5 sec. The washing operation pattern is repeatedly executed in the washing operation. The washing operation pattern is constituted by the three command data sampled for 50 msec. When the three command data constitute a set of data, the above-described operation pattern executed in the cycle of four seconds is constituted by 80 sets of data. These 80 sets of data are stored in ROM 59a. The phase command Pc is experimentally obtained in such a manner that a current flowing into each phase of the winding 26 of the brushless motor 20 is in phase with a voltage induced in each phase of the winding 26, as will be described in detail later.

The microcomputer 59 sequentially reads out one set of data or the three command data from ROM 59a at the interval of 50 msec. at steps M90, M100 and M110. The three command data thus read out are formed into a motor drive command, motor voltage command Vc and motor phase command Pc at steps M90, M100 and M110, respectively.

The microcomputer 59 then determines whether the washing operation has been completed, at step M120. When determining in the negative at step M120, the microcomputer 59 returns to step M90, where the formation of the three command data is repeated. On the other hand, when determining in the affirmative at step M120, the microcomputer 59 delivers a motor stop command to deenergize the brushless motor 20, thereby completing the washing operation (step M121). Subsequently, the microcomputer 59 returns to step M20. The determination of completion of the washing operation depends upon whether a washing operation time set according to the selected course has expired.

An actual energization of the brushless motor 20 is executed in the main processing for driving the motor as shown in FIG. 16, a first interrupt processing as shown in FIG. 17, and a second interrupt processing as shown in FIG. 18. Each processing will now be described. First, the main processing for motor drive is executed, for example, at the interval of 10 msec. simultaneously or in parallel with a main processing shown in FIGS. 15A and 15B. That is, the main processing for motor drive as shown in FIG. 16 is an interrupt processing executed at the interval of 10 msec.

In the main processing for motor drive, the microcomputer 59 determines at step D10 a motor starting condition on the basis of a motor drive command formed at step M90 in FIG. 15A. At step D10, "Y" designates the case where the motor drive command formed at step M90 represents the drive of the motor and "N" designates the case where the motor drive command represents the stop of the motor. A first "Y" of "Y—Y" designates the result of the last determination and a second "Y" designates the result of the current determination.

The microcomputer 59 determines in the negative at step D10 when the motor starting condition is "N." In this case, the microcomputer 59 advances to step D20, setting all the selection signals U1, U2, V1, V2, W1 and W2 at the low level L. Consequently, the selecting circuit 66 generates the low level drive signals Vup, Vun, Vvp, Vvn, Vwp and Vwn. These low level signals are supplied to the drive circuits 57a to 57f respectively. Thus, all the switching elements 54a to 54f of the inverter main circuit 47 are turned off such that the brushless motor 20 is deenergized. The microcomputer 59 then prohibits execution of the first and second interrupt processings at step D21, returning or terminating the motor drive main processing.

On the other hand, the microcomputer 59 advances to step D30 to set a starting flag at the high level H when the motor starting condition is "N–Y" at step D10. The microcomputer 59 then allows execution of the first and second interrupt processings at step D40. The microcomputer 59 delivers a command for execution of the first interrupt processing at step D50 so that the first interrupt processing is executed once. The microcomputer 59 then determines whether a predetermined time (100 msec., for example) has elapsed after receipt of the motor starting condition, at step D60. The microcomputer 59 terminates the motor drive main processing when determining in the negative at step D60. When determining in the affirmative or that the predetermined time has elapsed after the receipt of the motor starting condition, the microcomputer sets the starting flag at the low level L at step D70, terminating the motor drive main processing. Furthermore, the microcomputer 59 advances to step D60 when determining at step 10 that the motor starting command is maintained. The control is performed at step D60 in the same manner as described above.

Referring to FIG. 17, the first interrupt processing will now be described. The first interrupt processing is executed when any one of the position signals Hu, Hv and Hw generated by the three Hall ICs 31u, 31v and 31w respectively changes from the high level to the low level or from the low level to the high level, or when execution of the first interrupt processing is commanded at step D50 in FIG. 16. First, the microcomputer 59 inputs the position signals Hu, Hv and Hw generated by the respective Hall ICs 31u, 31v and 31w at step A10. Modes n (where n=1 to 6) of the position signals Hu, Hv and Hw are determined on the basis of a conversion table as shown in FIG. 11. The microcomputer 59 then inputs data DT1 from the first counter 60, storing the data as a change period Ts (n) at step A20. The microcomputer 59 delivers a reset signal RS1 to the first counter 60 to reset the latter, at step A30. By the execution of the steps A20 and A30, the first counter 60 is reset every time any one of the position signals changes its level, and the count immediately before reset of the first counter 60 is stored as the change period Ts (n) so as to correspond to the mode n.

The microcomputer 59 then advances to step A40, where the data DT1 delivered from the first counter 60 is supplied to the second counter 61 as data DT2. The microcomputer 59 delivers a reset signal RS2 to the second counter 60 to reset the latter, at step A50. Furthermore, the microcomputer 59 reloads an electrical angle counter EC with electrical angle data Ex, based on the electrical angle data as shown in FIG. 12, or executes EC=Ex (n), at step A60. The electrical angle data Ex represents rotational positions of the rotor 27 of the brushless motor 20 at change points of the position signals Hu, Hv and Hw in terms of the electrical angle. The electrical angle data Ex is written in RAM 59b serving as the working storage in the form as shown in FIG. 12 in the initial setting. The electrical angle counter EC supplies data representative of the rotational position of the rotor 27. The data is obtained by dividing one electrical period by 384, which electrical period is equal to an electrical angle corresponding to one revolution of the motor on the basis of a voltage induced at the winding 26u of phase U. The electrical angle counter EC is allocated in RAM 59b.

The microcomputer 59 then advances to step A70 to calculate a rotational period Tm which is a period required for one revolution of the motor 20. Data of a previously obtained rotational period Tm is stored as Tmp (Tmp=Tm). A current rotational period Tm is calculated by the equation, Tm=Ts (1)+Ts (2)+Ts (3)+Ts (4)+Ts (5)+Ts (6), and data of the currently obtained rotational period Tm is stored.

The microcomputer 59 then advances to step A80 to determine whether the starting flag is at the high level H. The starting flag is set at the high level H immediately after the microcomputer 59 receives a motor starting command or until a predetermined time elapses from receipt of the motor starting command. The microcomputer 59 determines in the affirmative at step A80, reading out data of voltage command Vc representative of the magnitude of voltage applied to the brushless motor 20 at step A90. The microcomputer 59 then advances to step A100 where, based on the rectangular wave data table as shown in FIG. 13, the microcomputer 59 delivers the output waveform data Du, Dv and Dw, and selection signals U1, U2, V1, V2, W1 and W2, terminating the first interrupt processing. The processings at steps A90 and A100 are executed in order that the rectangular wave voltage is supplied to the brushless motor 20 during the starting thereof. These processings will be described in detail later. On the other hand, the microcomputer 59 determines in the negative at step A when the starting flag is set at the low level "L," terminating the first interrupt processing.

The second interrupt processing will now be described with reference to FIG. 18. The second interrupt processing is executed by the coincidence signal ST2 which is generated every time the count of the second counter 61 or the clock signal ck2 coincides with the above-mentioned data DT2. More specifically, the microcomputer 59 delivers the reset signal RS2 to thereby reset the second counter 61 at step B10. The microcomputer 59 then advances to step B20 where calculation is executed to increment the electrical angle counter EC by a constant Ed. At step B20, the calculation is executed by the equation, EC=EC+Ed. The calculation is executed by the equation, EC=EC−384, where EC≧384. Data of the constant Ed is previously stored and it is "8" in the embodiment, for example.

The microcomputer 59 then advances to step B30 to determine whether the starting flag is at the high level H. The starting flag is set at the high level H immediately after the microcomputer 59 receives a motor starting command or until a predetermined time elapses from receipt of the motor starting command. The microcomputer 59 determines in the affirmative at step B30, terminating the second interrupt processing. A control manner in the case where the microcomputer 59 determines in the negative at step B30 will be described later.

The foregoing is a program for motor drive when the starting flag is set at the high level H after the microcomputer 59 receives the start signal. The forward drive of the brushless motor 20 in the above-described control will be described with reference to FIGS. 19A to 19K. FIG. 19A shows voltages induced at the three-phase windings 26u, 26v and 26w during rotation of the brushless motor 20. The induced voltages represent the rotational position of the rotor 27 or the position of the rotor. FIG. 19B shows the data of electrical angle obtained by dividing, by 384, the rotational period required for one revolution of the motor on the basis the voltage induced at the winding of phase U. FIG. 19C shows the position signals Hu, Hv and Hw generated by the respective Hall ICs 31u to 31w. The Hall ICs 31u to 31w are mounted so that the position signals Hu, Hv and Hw are changed from the high level H to the low level L or from the low level L to the high level H at crossover points of the induced voltages of the phases.

FIG. 19D shows the mode (n) determined at step A10 of the first interrupt processing as shown in FIG. 17. FIG. 19E shows the selection signals U1, U2, V1, V2, W1 and W2 delivered by the microcomputer 59 at step A100 of the first interrupt processing. FIG. 19F shows the output waveform data Du of phase U, which is one of output waveform data delivered by the microcomputer 59 at step A100.

The phase U comparator 62 of the control means 67 compares the phase U output waveform data Du or the 8-bit data Vc with the carrier wave Pz (FIG. 19G) delivered by the triangular wave generating circuit 65 or the 8-bit output data Pz, thereby delivering the signal Vu. The signal Vu is a pulse width modulated (PWM) signal having a frequency synchronous with the carrier wave Pz of the triangular wave generating circuit 65 and a duty cycle depending upon the output waveform data Du. The signals Vv and Vw delivered from the phase V and W comparators 63 and 64 are also PWM signals similar to the above-described signal Vu.

Regarding phase U, the selecting circuit 66 delivers the drive signals Vup and Vun on the basis of the signal Vu and the selection signals U1 and U2. In this case, the drive signal Vup delivered by the selecting circuit 66 is at the same level as the signal Vu and the drive signal Vun is at the low level L when the selection signals U1 and U2 are at the high level H and the low level L respectively. Consequently, the switching element 54a is energized via the drive circuit 55a to be driven. Furthermore, the drive signals Vup and Vun delivered by the selecting circuit 66 are at the low level L and the high level H respectively when the selection signals U1 and U2 are at the low level L and the high level H respectively. Consequently, the switching element 54b is turned on via the drive circuit 55b. Additionally, both of the drive signals Vup and Vun delivered by the selecting circuit 66 are at the low level L when both of the selection signals U1 and U2 are at the low level L. Consequently, both of the switching elements 54a and 54b are turned off.

Regarding phases V and W, the selecting circuit 66 delivers the drive signals Vvp, Vvn, Vwp and Vwn on the basis of the signals Vv and Vw and the selection signals U3, U4, U5 and U6 in the same manner as described above regarding phase U. FIG. 19H shows these drive signals Vup, Vun, Vvp, Vvn, Vwp and Vwn delivered by the selecting circuit 66. The switching elements 54a to 54f are on-off controlled via the drive circuits 57a to 57f by these drive signals Vup, Vun, Vvp, Vvn, Vwp and Vwn. Thus, the brushless motor 20 is energized for a period corresponding to an electrical angle of 120 degrees in each one ac cycle during the starting thereof or the rectangular wave voltage is applied to the brushless motor 20 during its starting.

FIG. 19I shows the resetting and counting operations of the first counter 60 executed at step A30 of the first interrupt processing shown in FIG. 17. The first counter 60 is reset at change points of the mode (n). Furthermore, the first interrupt processing as shown in FIG. 17 is also executed at the change points of the mode (n).

FIG. 19J shows the resetting and counting operations of the second counter 61 executed at steps A20, A40 and A50 of the first interrupt processing. Since the clock ck2 of the second counter 61 has the frequency eight times higher than clock ck1, the second counter 61 repeats the counting operation at intervals of one eighth period of the first counter 61, as shown in FIGS. 19I and 19J. The first and second counters 61 and 62 constitute multiplied signal generating means 77 for generating a multiplied signal obtained by multiplying the position signal. Accordingly, the second interrupt processing shown in FIG. 18 is executed at eight times during one mode (n).

FIG. 19K shows the counting operation of the electrical counter EC at each of the steps A60 and B30 of the first and second interrupt processings of respective FIGS. 17 and 18. As the result of execution of step A60, the count of the electrical counter EC is rewritten at the change points of the mode (n). Furthermore, as the result of execution of step B30, the electrical counter EC counts up eight times during one mode (n). Consequently, the electrical counter EC supplies the data changed in synchronism with the rotational position of the rotor 27.

The rectangular wave voltage is applied to the brushless motor 20 in the above-described manner when the microcomputer 59 receives the starting command. The application of the rectangular wave voltage to the motor 20 is continued for a predetermined time (100 msec, for example) starting upon receipt of the starting command. Upon lapse of the predetermined time, the microcomputer 59 determines in the affirmative at step D60 of the motor drive main processing of FIG. 16. Then, the starting flag is changed to the low level L at step D70.

Figure 9:
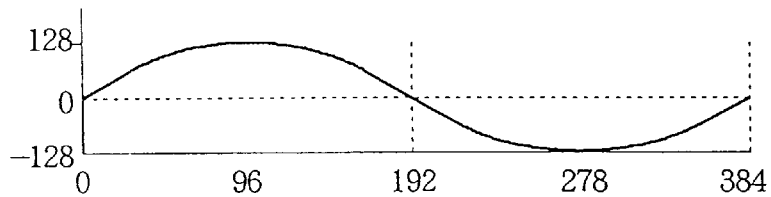
FIG. 9 is a waveform chart showing data of energization waveform.
Figure 10:
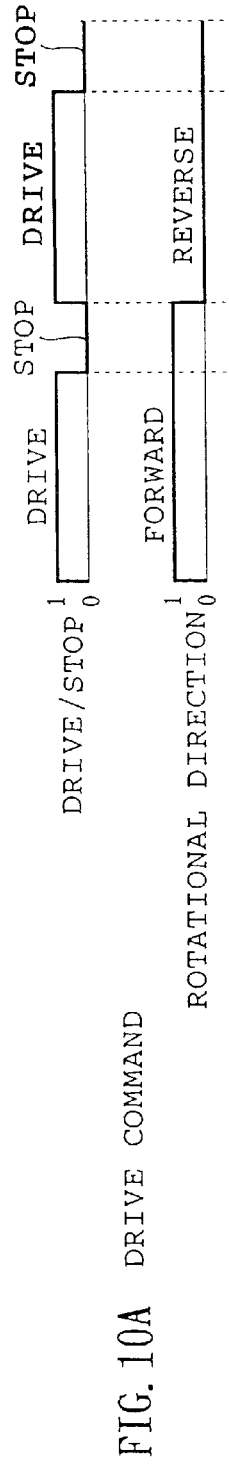
FIGS. 10A to 10C illustrate an example of the washing operation pattern.

The microcomputer 59 executes the following control when the starting flag is set at the low level L. The microcomputer 59 determines in the negative at step A80 of the first interrupt processing when the starting flag is set at the low level L. The microcomputer 59 then terminates the first interrupt processing without executing the steps A90 and A100. Furthermore, in the second interrupt processing, the microcomputer 59 determines in the negative at step B30 when the starting flag is set at the low level L. The microcomputer 59 then executes the step B40 to B100 sequentially. More specifically, data of the phase command Pc formed at step M190 of the main processing of FIG. 15B is read out at step B40. The phase Pv of the voltage applied to the brushless motor 20 is obtained by calculation on the basis of the phase command Pc and the electrical counter EC representative of the rotational position of the rotor 27. The calculation uses the equation, Pv=EC+Pc. However, the equation, Pv=Pv−384, is used where Pv≧384. The microcomputer 59 then advances to step B60 to read out the data of voltage command Vc formed at step M180 of the main processing of FIG. 15B. The microcomputer 59 further advances to step B70 to obtain and deliver the output waveform data Du. In this case, a voltage ratio Ds of the sinusoidal waveform corresponding to the voltage phase Pv obtained as described above is read out from energization waveform data as shown in FIG. 9. The output waveform data Du is calculated from the equation, Du=Ds×(Vc/256)+128. The voltage ratio Ds is represented as a range from −127 to 127, which range is a complement number range of the 8-bit data. The offset numeric value of 128 is added so that the numerical range of the voltage ratio Ds is shifted to a numerical range of the triangular waveform data Pz from 0 to 255. Furthermore, the voltage command Vc is also represented as a complement number range from 0 to 255. Accordingly, an amplitude according to the voltage command Vc is obtained by multiplying the voltage ratio Ds by (Vc/256). The output waveform data Du thus obtained from the above-described calculation is delivered from the microcomputer 59. The energization waveform data shown in FIG. 9 is composed of 8-bit voltage ratio data Ds in which one electrical period is divided by 384. The voltage ratio data Ds is previously stored in ROM 59a of the microcomputer 59. Furthermore, sinusoidal waveform data is also stored as energization waveform data in the embodiment.

The microcomputer 59 then advances to step B80 to calculate and deliver the output waveform data Dv. In this case, the voltage phase Pv is obtained from the equation, Pv=EC+Pc+256. The calculation is executed by the equation, Pv=Pv−384, where Pv≧384. The microcomputer 59 then reads out, from the energization waveform data of FIG. 9, the data of voltage ratio Ds of the sinusoidal waveform corresponding to the obtained voltage phase Pv. Subsequently, the microcomputer 59 calculates the output waveform data Dv from the equation, Dv=Ds×(Vc/256)+128. The microcomputer 59 then advances to step B90 to calculate and deliver the output waveform data Dw. In this case, too, the voltage phase Pv is obtained from the equation, Pv=EC+Pc+128. The calculation is executed by the equation, Pv=Pv−384, where Pv≧384. The microcomputer 59 then reads out, from the energization waveform data of FIG. 9, the data of voltage ratio Ds of the sinusoidal waveform corresponding to the obtained voltage phase Pv. Subsequently, the microcomputer 59 calculates the output waveform data Dv from the equation, Dw=Ds×(Vc/256)+128. The microcomputer 59 further advances to step B100 to deliver the selection signals U1, U2, V1, V2, W1 and W2 all of which are at the high level H, thereafter terminating the second interrupt processing. The foregoing is a control manner of the microcomputer 59 when the starting flag is set at the low level L.

The forward drive of the brushless motor 20 by the foregoing control manner will be described with reference to FIGS. 20A to 20J. FIG. 20F shows the voltage phase Pv obtained at step B50 of the second interrupt processing of FIG. 18. The voltage phase Pv leads a pre-calculation reference voltage by the phase command Pc obtained from the electrical angle counter EC at step B40 of the second interrupt processing of FIG. 18. FIG. 20G shows the output waveform data Du delivered at step B70 of the second interrupt processing. Upon output of the waveform data Du, the phase U comparator 62 of the control means 67 compares the output waveform data Du with the carrier wave Pz generated by the triangular wave generating circuit 65, thereby delivering the signal Vu. Based on the signal Vu and the selection signals U1 and U2, the selecting circuit 66 then delivers the drive signals Vup and Vun. Since both of the selection signals U1 and U2 are at the high level H in this case, the delivered drive signal Vup is at the same level as the signal Vu and the delivered drive signal Vun is an inversion of the signal Vu. FIG. 20H shows these delivered drive signals Vup and Vun. With respect to the phases V and W, the output waveform data Dv and Dw are output at steps B80 and B90 of the second interrupt processing respectively, and the selecting circuit 66 delivers the drive signals Vvp, Vvn, Vwp and Vwn although these data and signals are not shown in FIGS. 20A–20J. The output waveform data Dv and the drive signals Vvp and Vvn of the phase V lag the output waveform data Du and the drive signals Vup and Vun of the phase U by the electrical angle represented by the data, "128" respectively. The output waveform data Dw and the drive signals Vwp and Vwn of the phase W lag the output waveform data Du and the drive signals Vup and Vun of the phase U by the electrical angle represented by the data, "256" respectively.

The phase U drive signals Vup and Vun are supplied via the drive circuits 57a and 57b to the switching elements 54a and 54b of the inverter main circuit 47 so that the switching elements 54a and 54b are turned on and off. FIG. 20I shows a waveform of the voltage delivered from the phase U output terminal of the inverter main circuit 47. The phase U output voltage is the one obtained by pulse-width modulating the sinusoidal waveform or an approximately sinusoidal pulse-width modulated voltage. FIG. 20J shows a waveform of the current flowing in the phase U winding 26u of the brushless motor 20 when the phase U output voltage is applied to the winding. The winding current flowing in the phase U winding 26u is approximately in phase with the voltage induced at the phase U winding 26u shown in FIG. 20A. The reason for this is that the phase command Pc formed at step M110 of the main processing of FIG. 15 is the data experimentally obtained so that the current flowing in each phase winding during operation of the brushless motor 20 is in phase with the induced voltage of each phase.

Regarding the phases V and W, too, the drive signals Vvp, Vvn, Vwp and Vwn are supplied via the drive circuits 57c, 57d, 57e and 57f to the switching elements 54c, 54d, 54e and 54f of the inverter main circuit 47 so that the switching elements 54c to 54f are turned on and off. Consequently, the output voltages delivered from the phase V and W output terminals of the inverter main circuit 47 are also those obtained by pulse-width modulating the sinusoidal waveforms or approximately sinusoidal pulse-width modulated voltages. The winding currents flowing in the phase V and W windings 26v and 26w are approximately in phase with the voltages induced at the phase windings 26v and 26w when the phase V and W output voltages are applied to the phase windings, respectively.

The above-described operation is for the rotation of the brushless motor 20 in the forward direction. The operation for the rotation of the brushless motor 20 in the reverse direction is approximately the same as described above. The only difference is that data tables for the rotation in the reverse direction are used instead of those of position signal mode of FIG. 11, the electrical angle of FIG. 12 and the rectangular waveform of FIG. 13. These data for the rotation in the reverse direction are also stored in ROM 59a. The above-described rotations of the brushless motor 20 in the forward and reverse directions are repeated alternately until the washing operation is terminated or the microcomputer 59 determines in the affirmative at step M120 of the main processing of FIG. 15A.

A control manner for the dehydrating operation will now be described. Upon receipt of the dehydrating operation command, the microcomputer 59 determines in the affirmative at step M130 of the main processing of FIG. 15B, thereby energizing the drain valve motor 9 at step M140. The drain valve 7 is opened so that the water in the rotatable tub 4 is discharged. The water discharge from the rotatable tub 4 is continuously executed on the basis of the signals generated by the water level sensor 73 for detecting the water level in the rotatable tub 4 (step M150). As the result of energization of the drain valve motor 9, the change-over lever 33 of the clutch 32 is rotated downward such that the lower convex portion 33e thereof is engaged with two of the convex portions 28d on the upper face of the rotor housing 28, as shown in FIG. 7. Consequently, the tub shaft 12 is co-rotated with the motor rotor 27 and the agitator shaft 14. In this condition, the tub shaft 12, the rotatable tub 4, the agitator shaft 14 and the agitator 5 are directly driven by the brushless motor 20.

Upon completion of the water discharge from the rotatable tub 4, the microcomputer 59 advances to step M160 to select and set one of a plurality of dehydrating courses. The microcomputer 59 executes steps M170, M180 and M190 sequentially to thereby form an operation pattern (operation command) for the brushless motor 20. Data of a plurality of dehydrating operation patterns is stored in ROM 59a. The microcomputer 59 reads out one of the dehydrating operation patterns corresponding to the dehydrating course selected at step M160, thereby forming an operation pattern for the dehydrating operation.

FIGS. 14A to 14C show such a dehydrating operation pattern. The dehydrating operation pattern is constituted by 2 bit data of a drive command, 8 bit data of a voltage command Vc, and 9 bit data of a phase command Pc, for example, as shown in FIGS. 14A to 14C. The pattern shown in FIGS. 14A–14C is an operation pattern for the forward drive for 50 sec. This 50 sec. operation pattern is executed in the dehydrating operation.

The 50 sec. operation pattern is constituted by the three command data sampled for 1 sec. When the three command data constitute a set of data, the above-described 50 sec. operation pattern is constituted by 50 sets of data. These 50 sets of data are stored as the dehydrating operation patterns in ROM 59a. The phase command Pc as shown in FIG. 14C is experimentally obtained in such a manner that the current flowing in each phase winding of the brushless motor 20 leads the voltage induced in each phase winding, as will be described in detail later.

The microcomputer 59 reads out the data of dehydrating operation pattern or one set of data including the three command data from ROM 59a at intervals of one second at sequential steps M170, M180 and M190, thereby forming the motor drive command, the motor voltage command Vc and the motor phase command Pc. The microcomputer 59 repeatedly executes the processing for forming these commands until determining in the affirmative at any one of step M200 for determination of completion of the dehydrating operation, step M210 for determination of power stoppage, and M220 for determination about the lid switch.

An actual energization of the brushless motor 20 in the dehydrating operation is executed in the main processing for driving the motor as shown in FIG. 16, the first interrupt processing of FIG. 17, and the second interrupt processing of FIG. 18 as in the washing operation. These processing manners are substantially the same as those for the washing operation except that the dehydrating operation pattern of FIGS. 14A to 14C is used instead of the washing operation pattern of FIGS. 10A to 10C. Accordingly, A detail description of these processing manners will be eliminated.

The operation in which the dehydrating operation is terminated or the rotatable tub 4 under rotation is braked to be stopped will be described. First, a normal termination of the dehydrating operation will be described. Upon expiration of a dehydrating operation time set according to the selected dehydrating course, the microcomputer 59 determines at step M200 that the dehydrating operation has been terminated. The microcomputer 59 then advances to step M230 for execution of a normal braking processing. At step M230, the microcomputer 59 delivers the low-level selection signals U1, V1 and W1, and the high-level selection signals U2, V2 and W2.

Upon receipt of the selection signals, the selecting circuit 66 delivers the low-level drive signals Vup, Vvp and Vwp, and the high-level drive signals Vun, Vvn and Vwn, whereupon the switching elements 54a, 54c and 54e of the inverter main circuit 47 are turned off whereas the switching elements 54b, 54d and 54f are turned on. Consequently, the windings 26u, 26v and 26w of the brushless motor 20 form short circuits together with switching elements 54b, 54d and 54f, and the diodes 55b, 55d and 55f respectively, whereby a braking torque is produced. The braking torque causes the brushless motor 20 and accordingly, the rotatable tub 4 to stop rotating. The microcomputer 59 executes the normal braking processing for a predetermined time and thereafter returns to step M20.

The microcomputer 59 executes a processing for braking the rotatable tub 4 in emergency at steps M240 to M280 when a power stoppage occurs during the dehydrating operation or when the lid 74 is opened during the dehydrating operation. Upon occurrence of the power stoppage, the microcomputer 59 determines in the affirmative on the basis of the signal generated by the power stoppage detecting circuit 72 at step M210, advancing to step M240. Furthermore, when the lid 74 has been opened, the microcomputer 59 determines in the affirmative on the basis of the switch signal generated by the lid switch 75 at step M220, advancing to step M240.

At step M240, the microcomputer 59 delivers a relay-off signal to the relay drive circuit 70 to turn off the relay 48. The microcomputer 59 then advances to step M250 to form an emergency braking motor phase command Pc. In this case, a phase lag of "–16" is formed as the emergency braking motor phase command Pc, for example. The microcomputer 59 further advances to step M260 to form a predetermined emergency braking motor voltage command Vc. The processings for forming the emergency braking motor phase and voltage commands Pc and Vc are repeatedly executed until the rotational speed of the brushless motor 20 is decreased to a predetermined value for determination of speed decrease.

The emergency braking motor phase command Pc leads the brushless motor 20 to the regenerative state or causes the regenerative braking when supplied to the brushless motor 20. The regenerative braking decreases the rotational speed of the brushless motor 20 and accordingly, that of the rotatable tub 4. A regenerative current generated in the stator winding 26 of the brushless motor 20 flows through the diodes 55a to 55f of the inverter main circuit 47 to the dc power supply circuit 43 side. The regenerative current charges the capacitors 42a and 42b of the dc power supply circuit 43 via the diode 49, thereby increasing the dc voltage. Even if a power stoppage has occurred, the regenerative current operates the voltage regulator circuit its 45 so that a constant voltage is applied to the microcomputer 59. Consequently, the microcomputer 59 continues the controlling operation even in the occurrence of the power stoppage.

The microcomputer 59 detects, via the voltage divider circuit 69, a charge voltage of each of the capacitors 42a and 42b of the dc power supply circuit 43 or the magnitude of the dc voltage at intervals of 1 msec. The microcomputer 59 delivers an ON signal to the drive circuit 52 of the charging means 53 to turn on the switching element 51 when the detected dc voltage exceeds 400 V. Consequently, the regenerative current is consumed by a discharging resistance 50 of the discharging means 53 such that the increase in the dc voltage of each of the capacitors 42a and 42b of the dc power supply circuit 43 is limited. Furthermore, the microcomputer 59 delivers an OFF signal to the drive circuit 52 of the discharging means 53 to turn off the switching element 51 when the detected dc voltage is at or below 350 V.

The microcomputer 59 determines in the affirmative at step M270 when the rotational speed of the brushless motor 20 has been decreased to the predetermined value for determination of speed decrease as the result of the regenerative braking. In this case, the rotational speed of the brushless motor 20 is detected on the basis of the rotational period Tm obtained at step A70 of the first interrupt processing of FIG. 17. More specifically, the microcomputer 59 determines in the affirmative at step M270 when determining that the rotational period Tm is longer than the set value for determination of speed decrease or that the rotational speed has been decreased. Subsequently, the processing for the normal braking as at step M230 is executed, whereupon the brushless motor 20 and accordingly, the rotatable tub 4 are stopped. The normal braking processing is executed for the predetermined time and thereafter, the microcomputer 59 returns to step M20.

In the foregoing full automatic washing machine, the above-described washing and dehydrating operations are suitably combined together so that wash, rinse and dehydration steps of the set washing courses are executed. When the washing and dehydrating operations are executed, the operation patterns most suitable for each step and the washing course are used as the washing and dehydrating operation patterns in each step.

According to the above-described embodiment, the change-over lever 33 of the clutch 32 is rotated upward in the washing operation so that the agitator shaft 14 and accordingly, the agitator 5 are driven forward and reversed directly by the rotor 27 of the brushless motor 20. Furthermore, the change-over lever 33 is rotated downward in the dehydrating operation so that the agitator shaft 14, tub shaft 12, agitator 5 and rotatable tub 4 are rotated together forward at high speeds directly by the rotor 27. Thus, the direct drive structure eliminates a belt transmission mechanism and a gear reduction mechanism. Consequently, the weight and size of the washing machine can be reduced, and the noise due to its operation can be reduced.

The sinusoidal energization signals are formed on the basis of the position signals delivered by the Hall IC 31. The brushless motor 20 is supplied with the sinusoidal energization signals to be energized. Consequently, since the variations in the torque of the brushless motor 20 is reduced, the vibration and noise due to operation thereof can be reduced.

The reduction in the motor torque variations in the foregoing embodiment will be described. Upon receipt of the position signals Hu, Hv and Hw from the respective three Hall ICs 31u, 31v and 31w, the microcomputer 59 detects the position of the rotor 27 up to the resolution obtained by dividing a period of one revolution of the motor by 48. The microcomputer 59 reads out the sinusoidal waveform data stored in ROM 59a and corresponding to the detected rotor position, thereby forming the sinusoidal voltage waveform data corresponding to the rotor position. The voltage waveform data is pulse-width modulated and then supplied to the stator winding 26 via the drive circuits 57a–57f and the inverter main circuit 47.

The phase of the above-described voltage waveform data relative to the rotor position is controlled in the following manner. First, in the washing operation, the phase command Pc is formed on the basis of the washing operation pattern of FIGS. 10A–10C so that the voltages induced in the three-phase windings 26U, 26V and 26W are in phase with the winding currents flowing in the windings 26U, 26V and 26W respectively. Consequently, the brushless motor 20 produces torques shown as torque waveform simulation in FIGS. 21A and 21B. In this case, the brushless motor 20 is a three-phase 24-pole motor. The winding 26 has an inductance of 50 mH and a resistance of 10Ω. The rotational speed N is 150 rpm. The voltage induced in each of the three-phase windings is 40 V sin θ. The voltage command Vc is the data of "255" and the phase command Pc is the data of "32."

Figure 21A:
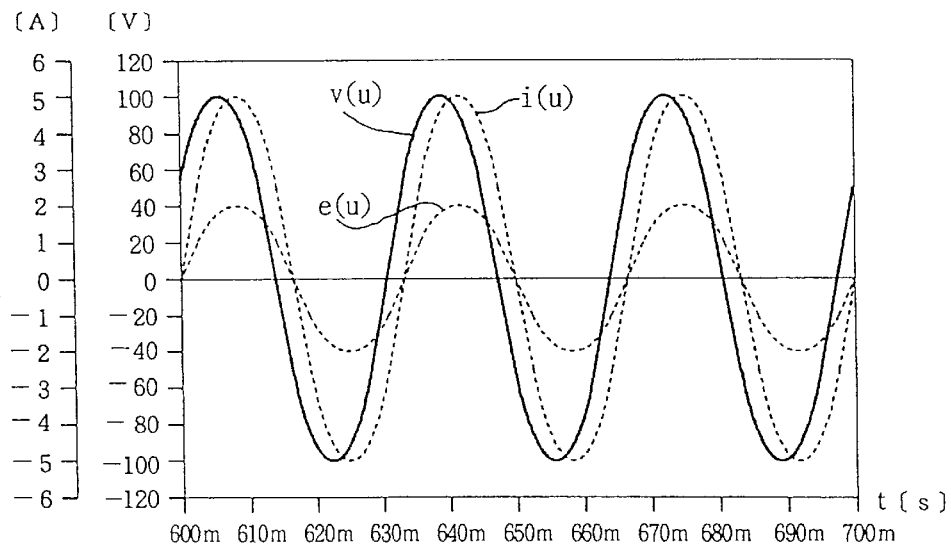
FIGS. 21A and 21B are waveform illustrations, showing torque waveforms of the brushless motor in a washing operation.

Reference symbol v(u) in FIG. 21A designates a phase U output voltage of the inverter main circuit 47. Although the phase U output voltage actually has a complicate pulse-width modulated waveform, it is approximated to a sinusoidal waveform and shown as an analog voltage (ac voltage) here. Reference symbol e(u) designates a voltage induced in the phase U winding 26u and reference symbol i(u) designates a winding current flowing in the phase U winding 26u. Reference symbol T(u) in FIG. 21B designates a torque waveform of phase U and reference symbol T designates a three-phase torque waveform. The phase U torque waveform T(u) is obtained from the following equation:

$$T(u)=(i(u) \times e(u))/(2 \times \pi \times N/60)$$

where N is the rotational speed. The three-phase torque waveform is obtained from the following equation:

$$T=(i(u) \times e(u)+i(v) \times e(v)+i(w) \times e(w))/(2 \times \pi \times N/60).$$

Figure 21B:
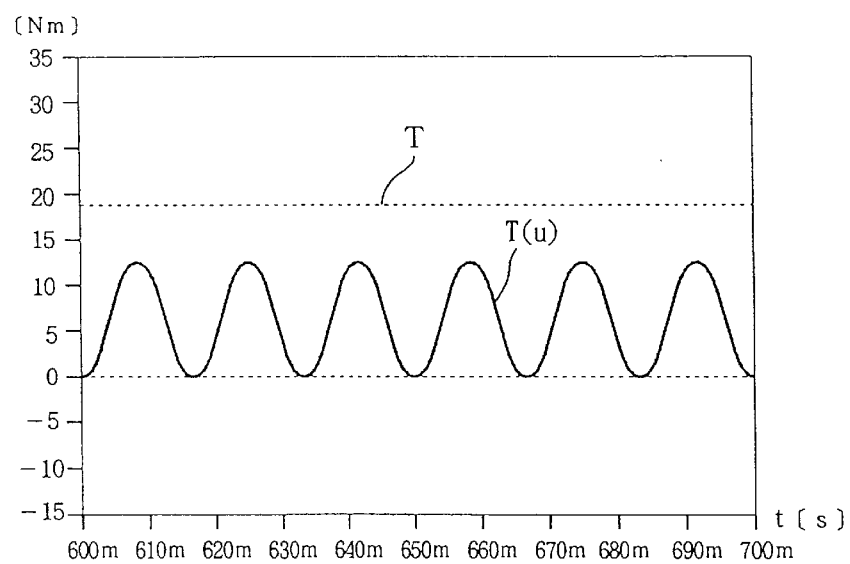

FIG. 21A shows that, since the winding current is in phase with the induced voltage, that is, the power factor is maximum, the efficiency of the brushless motor 20 is rendered maximum. Furthermore, FIG. 21B shows that, since the three-phase torque waveform is linear, there are few torque variations. Consequently, the vibration and noise due to operation of the brushless motor can be reduced in the washing operation.

In the dehydrating operation, the phase command Pc is formed on the basis of the dehydrating operation pattern of FIGS. 14A–14C so that the winding currents flowing in the winding 26U, 26V and 26W lead the voltages induced in the three-phase windings 26U, 26V and 26W respectively. As the result of this control manner, the brushless motor 20 produces torques shown as torque waveform simulation in FIGS. 22A and 22B. Reference symbols v(u), e(u), i(u), T(u) and T have the same definitions as those in FIGS. 21A and 21B. The brushless motor 20 is also a three-phase 24-pole motor. The winding 26 has an inductance of 50 mH and a resistance of 10Ω. However, the rotational speed N is 900 rpm. The voltage induced in each of the three-phase windings is 240 V sin θ. The voltage command Vc is the data of "255" and the phase command Pc is the data of "64."

Figure 22A:
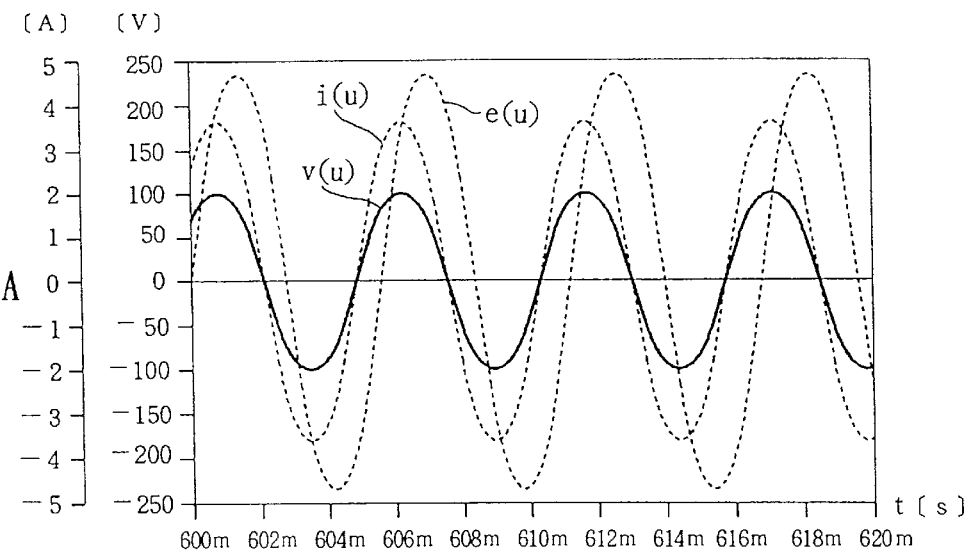
FIGS. 22A and 22B are waveform illustrations, showing torque waveforms of the brushless motor in a dehydrating operation.
Figure 23:
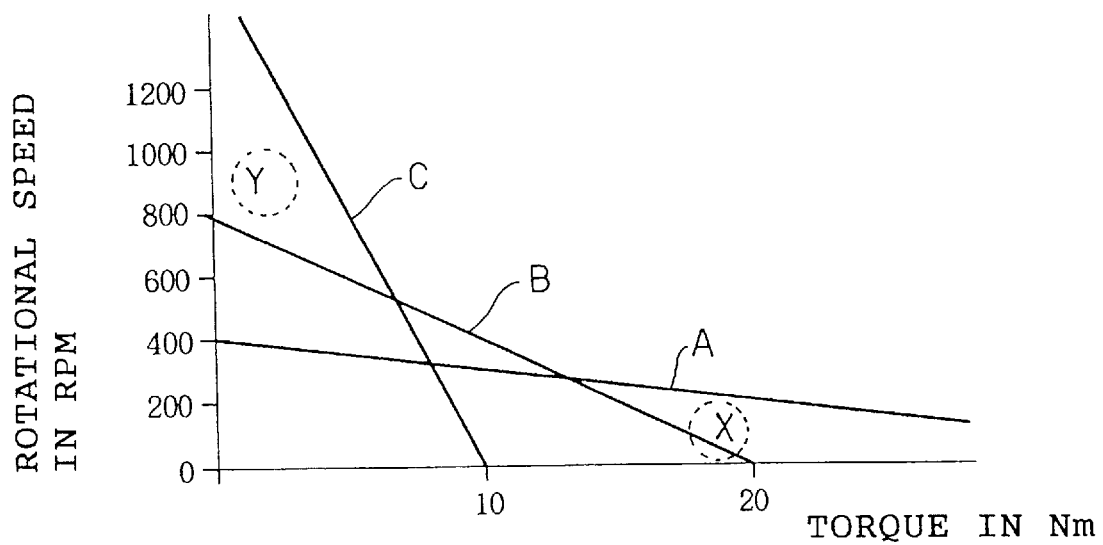
FIG. 23 shows rotational speed versus torque characteristics of the brushless motor.
Figure 24A:
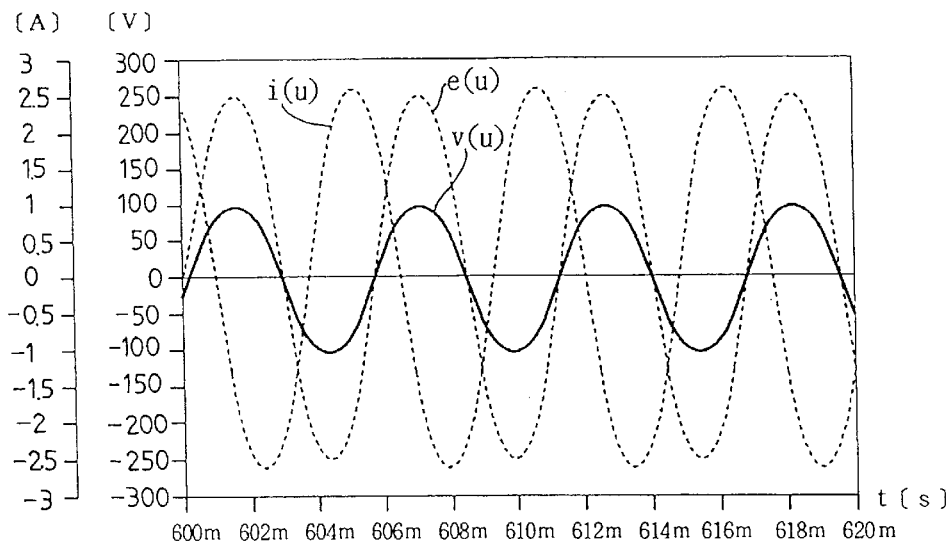
FIGS. 24A and 24B are waveform illustrations, showing torque waveforms of the brushless motor in an emergency braking.
Figure 24B:
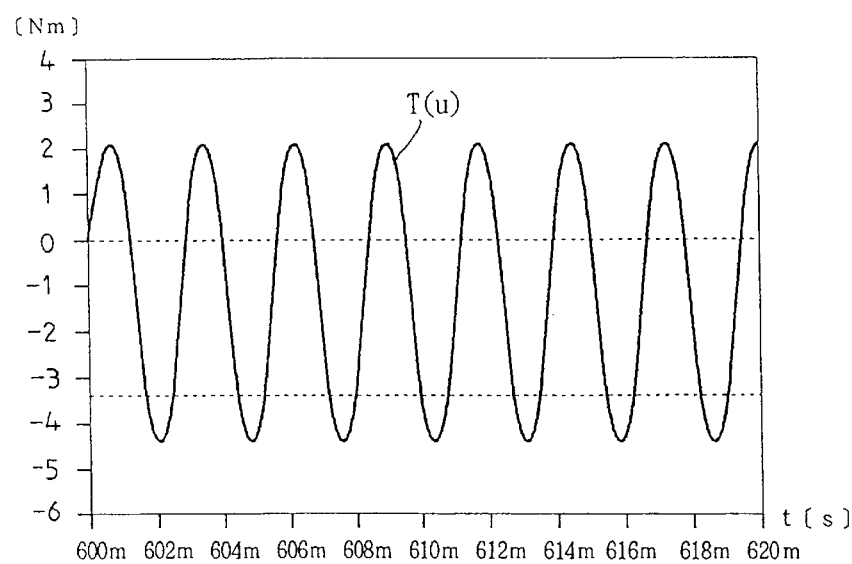

FIG. 22A shows that a positive torque is produced although the voltage induced in each phase is larger than the output voltage of the inverter main circuit 47. This means that the rotational speed of the brushless motor 20 can be forced to be increased. The forced increase in the rotational speed will be described with reference to FIG. 23 showing the torque-speed characteristics. The characteristic A in FIG. 23 represents a normal characteristic of the brushless motor 20. In this case, the rotational speed of the brushless motor 20 is limited so that the induced voltage of each phase winding does not exceed the output voltage of the inverter main circuit 47. The characteristic B represents the case where the brushless motor 20 is controlled so that the winding currents lead the induced voltages respectively. The characteristic C represents the case where the brushless motor 20 is controlled so that the winding currents lead the respective induced voltages to a larger extent than in the characteristic B.

Reference symbol X in FIG. 23 represents a region of a load point in the washing operation. The characteristic A renders the motor efficiency maximum when the load point is within the region X. On the other hand, reference symbol Y represents a region of a load point in the dehydrating operation. If the characteristic A is maintained, the brushless motor 20 cannot be driven when the load point is within the region Y. In the above-described embodiment, however, the brushless motor 20 is controlled so that the winding currents lead the induced voltages respectively, whereby the characteristic B is obtained. Thus, the brushless motor 20 having the characteristic A can be driven even when the load point is within the region Y in the dehydrating operation.

Figure 22B:
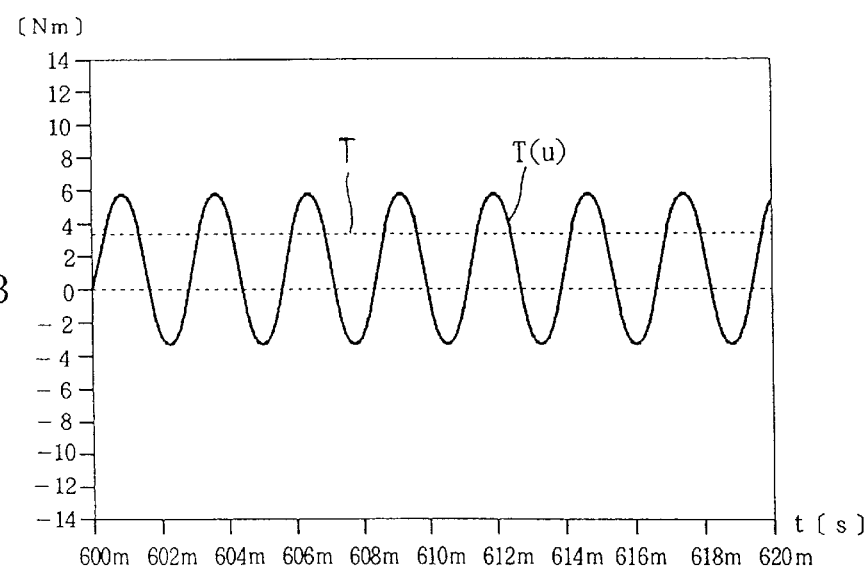

Furthermore, the three-phase torque waveform T is linear as shown in FIG. 22B while the brushless motor 20 is being controlled so that the characteristic C is obtained. Consequently, since there are few torque variations, the vibration and noise due to operation of the brushless motor can be reduced in the dehydrating operation.

The case where the brushless motor 20 and accordingly, the rotatable tub 4 are braked in an emergency during the dehydrating operation will now be described. In the foregoing embodiment, the phase command Pc is formed so that the winding currents lag behind the induced voltages respectively. As the result of this control manner, the brushless motor 20 produces torques shown as torque waveform simulation in FIGS. 24A and 24B. Reference symbols v(u), e(u), i(u), T(u) and T have the same definitions as those in FIGS. 21A and 21B. The brushless motor 20 is also a three-phase 24-pole motor. The winding 26 also has an inductance of 50 mH and a resistance of 10Ω. However, the rotational speed N is 900 rpm. The voltage induced in each of the three-phase windings is 240 V sin θ. The voltage command Vc is the data of "255" and the phase command Pc is the data of "−16."

Since the three-phase torque waveform T is linear as shown in FIG. 22B, there are few torque variations. Furthermore, the torque waveform T represents a negative torque, which means that the braking torque is produced. Consequently, the vibration and noise due to operation of the brushless motor 20 can be reduced in the emergency braking during the dehydrating operation.

In the foregoing embodiment, the electrical angle of the energization signal waveform is determined on the basis of the electrical angle indicative of the rotational position of the motor rotor 27 and the phase command. The energization signal waveform data and the voltage command both corresponding to the determined electrical angle are read out from ROM 59a. The energization signal is formed on the basis of the energization signal waveform data and the voltage command read out from ROM 59a. The brushless motor 20 is thus controlled according to the energization pattern most suitable for each of the washing, dehydrating and braking operations. Consequently, the motor current can be reduced and the braking performance can be improved.

Furthermore, the voltage of the dc power supply circuit 43 is detected. The energization signal is formed on the basis of the energization signal waveform data and the voltage command both read out from ROM 59a, and the detected dc power supply voltage. Even if the dc power supply voltage varies, the energization signal can be formed so as to compensate for the variations in the dc power supply voltage. Consequently, the brushless motor can be controlled according to a high precision energization signal waveform. Furthermore, since the capacity of each of the capacitors 42a and 42b of the dc power supply circuit 43 can be reduced, the size and accordingly, the cost of the inverter device 68 can be decreased.

The brushless motor 20 is energized in the washing operation so that the three-phase winding currents are in phase with the voltages induced in the phase windings 26U, 26V and 26W of the brushless motor 20 respectively. Accordingly, since the power factor is maximum, the motor efficiency can be improved. Furthermore, since an amount of electric power consumed is decreased, an amount of heat generated by each of the brushless motor 20 and the inverter device 68 can be reduced and accordingly, an arrangement of countermeasure against heat can be simplified. Furthermore, the phase of the energization current is adjusted on the basis of the experimentally obtained phase command patterns. The current phase can be adjusted without use of the arrangement for detecting the winding currents. Consequently, the size and accordingly, the cost of the inverter device 68 can further be decreased.

The brushless motor 20 is energized in the dehydrating operation so that the winding currents lead the voltages induced in the phase windings 26U, 26V and 26W of the brushless motor 20 respectively. Accordingly, the brushless motor 20 designed and specified as a low speed motor can be driven at higher speeds, that is, the dehydrating operation can be executed by the so designed brushless motor 20. Since the motor current in the washing operation is reduced, the capacity of each component of the inverter device 68 can be decreased. Consequently, the size and accordingly, the cost of the inverter device 68 can further be decreased.

The brushless motor 20 is further energized in the braking operation so that the winding currents lag behind the voltages induced in the phase windings 26U, 26V and 26W of the brushless motor 20 respectively. Accordingly, a large braking force can be obtained whereas the torque variations are extremely reduced. Consequently, the brushless motor 20 can be stopped in a short time even when the lid 74 is opened during high speed rotation thereof or the dehydrating operation. A mechanical braking arrangement and noise due to operation thereof can thus be eliminated. Furthermore, the overall size of the washing machine can be reduced as the result of elimination of the mechanical braking arrangement.

The three Hall ICs 31u, 31v and 31w deliver the position signals having a predetermined phase relation with the voltages induced in the phase windings 26U, 26V and 26W respectively. The electrical angle detecting means detects the electrical angle indicative of the rotor position in the period shorter than the period of variation of each position signal. Consequently, the electrical angle indicative of the rotor position can be detected by the Hall ICs 31u, 31v and 31w to a high resolution. Consequently, since a position sensor of the high resolution type is unnecessary, the production cost of the position sensor can be reduced, and the reliability of the position sensor against water, dust, etc. can be improved.

The rectangular wave voltage formed by logical operation of the position signals is applied to the brushless motor 20 for the starting thereof. Thereafter, the brushless motor 20 is supplied with the voltage based on the energization signal delivered by the energization signal forming means 67. Thus, the voltage supplied to the brushless motor 20 is switched. Consequently, the brushless motor 20 can smoothly be started.

Figure 25:
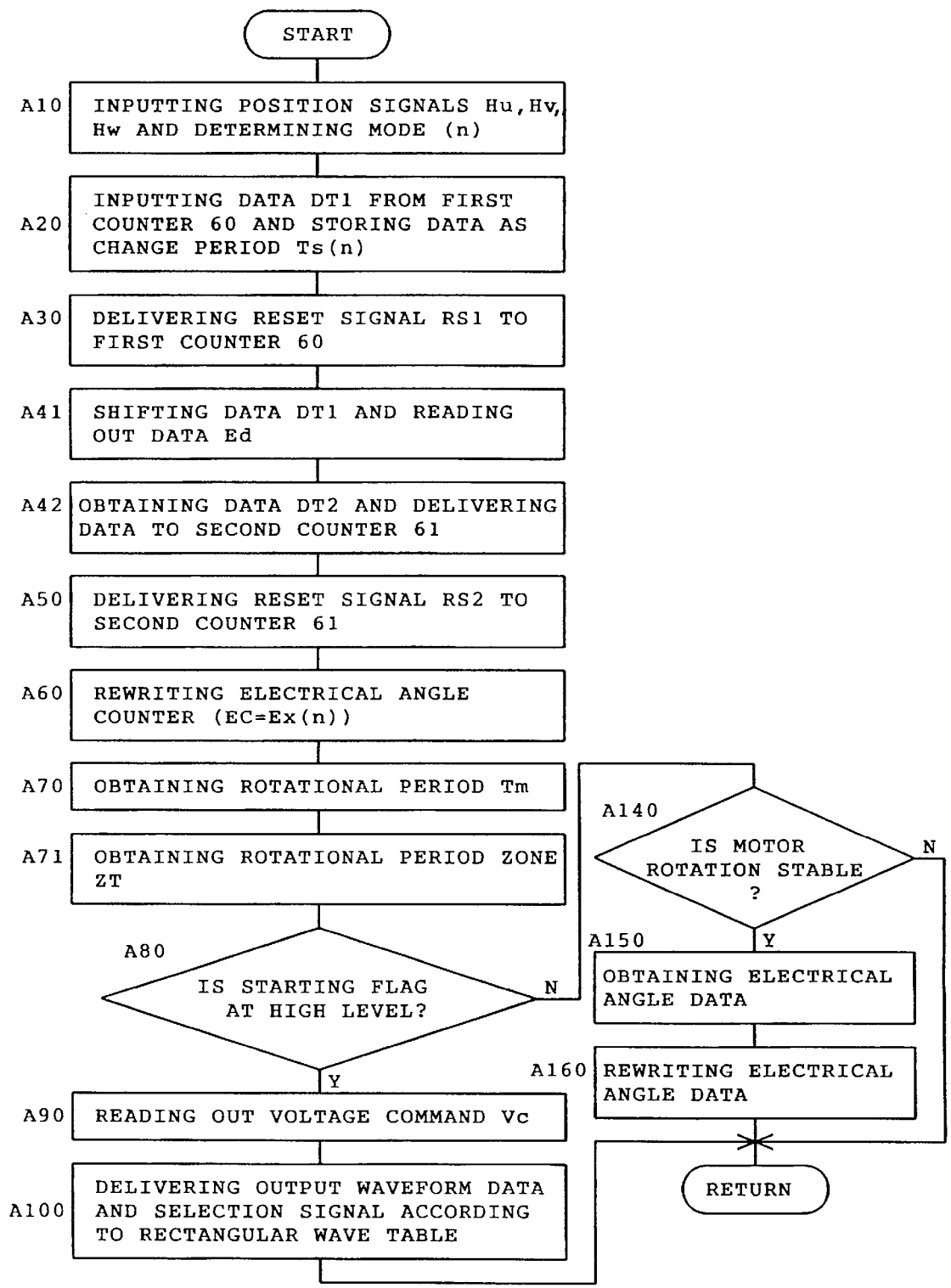
FIG. 25 is a flowchart showing the first interrupt processing in the washing machine of a second embodiment in accordance with the present invention.
Figure 26:
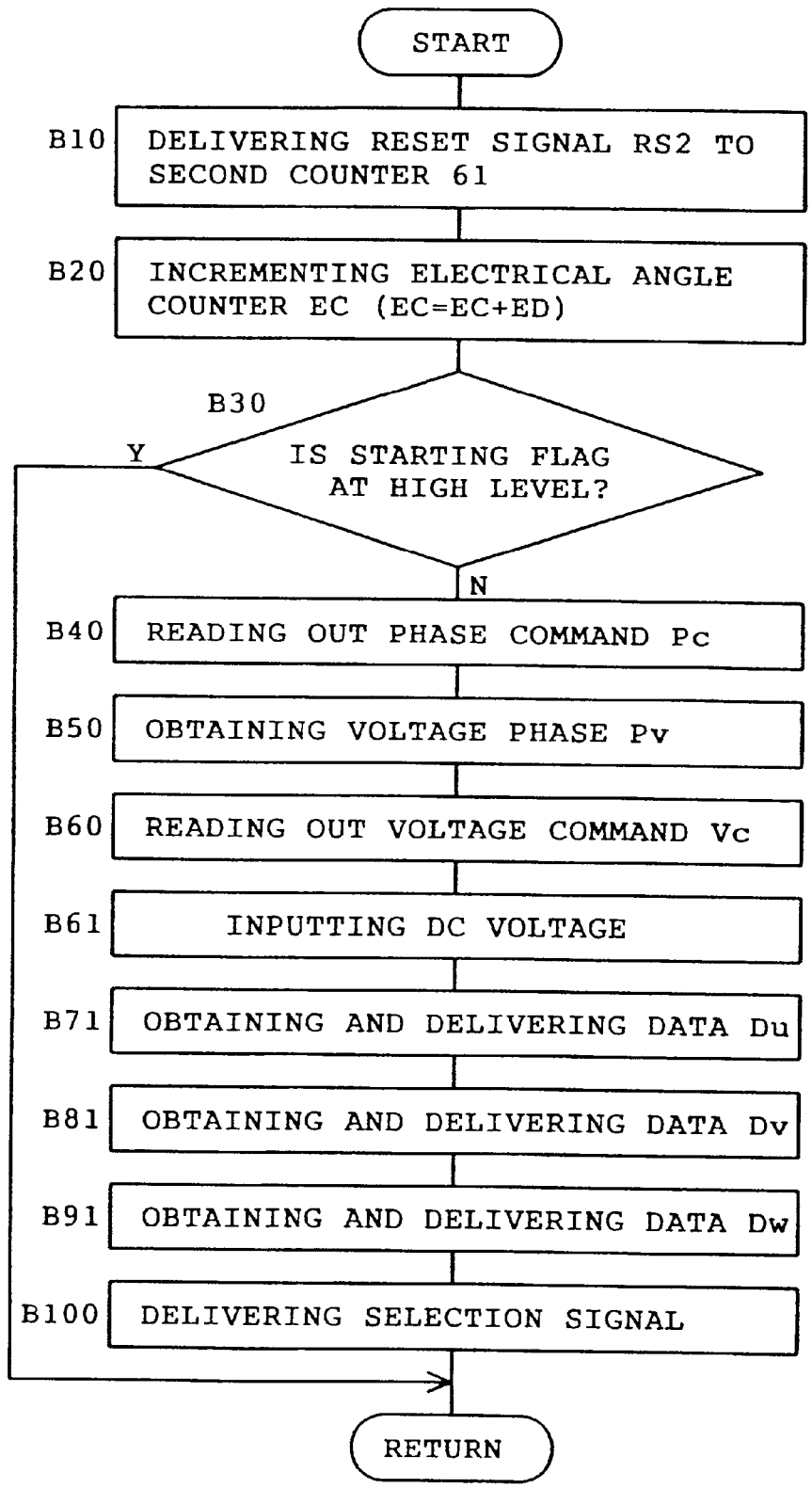
FIG. 26 is a flowchart showing the second interrupt processing in the second embodiment.
Figure 30:
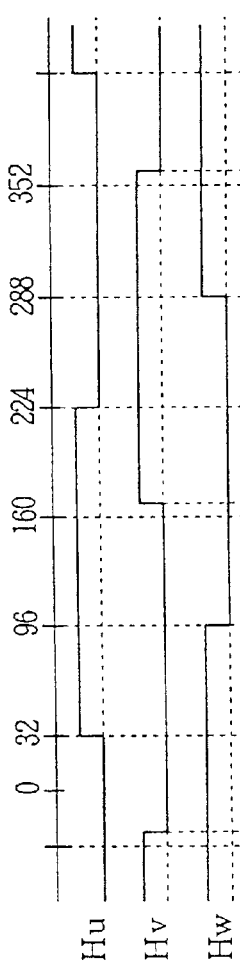
FIGS. 30A to 30H are time charts showing a control manner for the brushless motor in the second embodiment.

FIGS. 25 to 30H illustrate a second embodiment of the present invention. The second embodiment differs from the first embodiment in the control manners of the microcomputer 59 in the first and second interrupt processings. In FIGS. 25 and 26, the identical steps are labeled by the same reference symbols as those in FIGS. 17 and 18.

The first interrupt processing of FIG. 25 differs from that in the first embodiment in steps A41, A42, A71, A150 and A160. The processing at step A71 will first be described for the convenience' sake in the description. The microcomputer 59 obtains a rotational period zone ZT by calculation at step A71. The rotational period zone ZT is obtained from the following equations on the basis of the rotational period Tm obtained at step A70 according to the table of rotational period zone data stored at ROM 59a and shown in FIG. 27. The rotational period zone data table is provided for dividing the rotational period into eight parts.

When Tm<TmH, ZT=ZT+1 and when Tm>TmH, ZT=ZT−1 where $0 \leq ZT \leq 7$.

The microcomputer 59 selects a multiplier on the basis of the last obtained rotational period zone ZT when executing the processing at step A41 in the subsequently executed first interrupt processing. More specifically, the microcomputer 59 selects, from multiplier data table of FIG. 28 stored in ROM 59a, electrical angle increase data Ed and the number of shifting operations at which data DT1 is shifted to be decremented. The data Ed is used at step B20 in the second interrupt processing of FIG. 26. The data DT1 is shifted at the selected number of times. For example, when the rotational period zone ZT is "6," "0" is selected as the number of shifting operations and "8" is selected as the electrical angle increase data Ed from the multiplier data table of FIG. 28. In this case, no shifting operation is executed, and the multiplier is the same as in the first embodiment. Furthermore, when the rotational period zone ZT is "3," "1" is selected as the number of shifting operations and "4" is selected as the electrical angle increase data Ed from the multiplier data table of FIG. 28. In this case, data DT1 is shifted once such that data DT1 becomes ½. This is equivalent to doubling the period of clock ck1. The operating period of the second counter 61 is rendered 1/16 of that of the first counter 60 at step A50 when the shifted data DT1 (½ of data DT1) is supplied to the second counter 61. Consequently, the second interrupt processing of FIG. 26 is executed at 16 times during one mode, that is, the multiplier becomes "16." Furthermore, since the electrical angle data Ed is "4," the electrical angle counter EC is incremented four by four at step B20 of the second interrupt processing of FIG. 26. The calculation of the waveforms (Du, Dv and Dw) of output data is executed according to the increment of the electrical angle counter EC. Consequently, the resolution of the output data waveform can further be improved.

The microcomputer 59 advances to step A42 for compensation of the position sensor subsequently to the above-described processing at step A41. In the compensation of the position sensor, data DT2 is obtained with reference to the electrical angle data table of FIG. 12 from the equation, DT2=DT1×64/(Ex(n)−Ex(n−1)). "384" is added when the term, (Ex(n)−Ex(n−1)), is negative. The obtained data DT2 is delivered to the second counter 61. In this case, since (Ex(n)−Ex(n−1))=64 until the electrical angle data is rewritten at step A160 as will be described later, DT2=DT1. Subsequently, the microcomputer 59 determines at step A140 whether the rotation of the brushless motor 20 is stable. This determination depends upon whether the difference between the two rotational periods Tm and Tmp obtained at step A70 is in a predetermined range. When the difference between Tm and Tmp is in the predetermined range, the microcomputer 59 determines that the rotation of the brushless motor 20 is stable. In this case, the microcomputer 59 determines in the affirmative at step A140, advancing to step A150 for the following calculation:

$Ex(1)=32$ and $Ex(n)=Ex(n-1)+64 \times Ts(n-1)/(Tm/6)$.

The microcomputer 59 then advances to step A160 to rewrite the electrical angle data table on the basis of the results of the above calculation. The rewritten electrical angle data table is subsequently used for execution of the processing at step A42.

Steps A42 to A160 of the first interrupt processing of FIG. 25 or the processing for compensation of the position sensor will now be described with reference to FIGS. 30A to 30H. FIGS. 30A–30H show the case where an installation error of the phase V Hall IC 31v results in a phase shift of the position signal Hv as shown in FIG. 30B. The microcomputer 59 executes the step A20 of the first interrupt processing of FIG. 25 under the above-described condition to obtain the change period Ts(n). Assume now that the obtained change period Ts(n) is shown in FIG. 30D. In this case, the electrical angle data Ex(n) is calculated at step A150 as follows:

$Ex(1)=32$, $Ex(2)=32+64 \times 8000/8000=96$, $Ex(3)=96+64 \times 9000/8000=168$, $Ex(4)=168+64 \times 7000/8000=224$, $Ex(5)=224+64 \times 8000/8000=288$, and $Ex(6)=288+64 \times 9000/8000=360$.

Based on these results of calculation, the microcomputer 59 rewrites the electrical angle data table shown in FIG. 12 into the one as shown in FIG. 29. Thereafter, the data DT2 is obtained at step A42 from the equation, DT2=9000×64/(168−96)=8000, for example, when the data is calculated in synchronism with rise of the position signal Hv. The number of shifting operations is "0" and DT1=9000 in the shift processing at step A41. The obtained data DT2 is delivered to the second counter 61. As a result, the counting operations of the first and second counters 60 and 61 are those as shown in FIGS. 30F and 30G respectively.

The electrical angle data table shown in FIG. 29 is used for rewriting the data of the electrical angle counter EC at step A60. Consequently, the count of the electrical angle counter EC is shown in FIG. 30H. FIG. 30H shows that the detection of position of the rotor 27 is continuously carried out without distortion. More specifically, even when the installation error of the phase V Hall IC 31v results in a shift of the position signal Hv, the above-described compensation of the position signal can compensate the position signal and accordingly, the detection of position of the rotor 27 can accurately be executed. The position signal can be compensated in the same manner as described above when an installation error of another Hall IC results in a shift of the position signal produced therefrom.

The second interrupt processing in the second embodiment will be described with reference to FIG. 26. Since steps B10 to B60 in FIG. 26 are the same as those in the first embodiment of FIG. 18, the description will be eliminated. The microcomputer 59 advances to step B61 after the voltage command Vc is read out at step B60. The dc power supply voltage of the dc power supply circuit 43 is input at step A61. The microcomputer 59 inputs a voltage signal obtained by the voltage divider circuit 69 by dividing the dc power supply voltage of the dc power supply circuit 43 into $5/512$. The input voltage signal is converted by an analog-to-digital (A/D) conversion function incorporated in the microcomputer 59 to a digital voltage data such as 8 bit data Vs.

The microcomputer 59 then advances to step B71 to read out, from the energization waveform data of FIG. 9, a sinusoidal waveform voltage ratio Ds corresponding to the obtained voltage phase Pv. The microcomputer 59 further obtains the output waveform data Du from the equation, Du=Ds×(Vc/256)×(Vr/Vs)+128. This equation differs from that in the first embodiment in that Ds is multiplied by (Vr/Vs). Vr is more specifically data of "90." The data Ds is multiplied by the value varying in the range of (90/100) to (90/110) as (Vr/Vs) when the dc power supply voltage varies in the range of 200 V to 220 V, for example.

The microcomputer 59 then advances to step B81 to obtain the voltage phase Pv and the output waveform data Dv. The voltage phase Pv is obtained from the equation, Pv=EC+Pc+256 where Pv=Pv−384 when Pv≧384. The output waveform data is obtained from the equation, Dv=Ds×(Vc/256)×(Vr/Vs))+128. The microcomputer 59 advances to step B91 to further obtain the voltage phase Pv from the equation, Pv=EC+Pc+128 where Pv=Pv−384 when Pv≧384 and the output waveform data Dw from the equation, Dw=Ds×(Vc/256)×(Vr/Vs)+128.

Thus, even when the dc power supply voltage varies, the output waveform data Du, Dv and Dw are obtained by calculation according to the variations as the result of execution of steps B61 to B91. Accordingly, the delivered output waveform data Du, Dv and Dw can be prevented from adversely affected by the variations in the dc power supply voltage. Consequently, the brushless motor 20 can accurately be controlled regardless of the variations in the dc power supply voltage. In the above-described second embodiment, the microcomputer 59 serves as multiplied signal generating means, rotor position estimating means, rotational stability determining means, electrical angle data calculating means, and compensating means.

The other arrangement of the washing machine of the second embodiment is the same as in the first embodiment. Accordingly, the same effect as in the first embodiment can be achieved in the second embodiment. In the second embodiment, particularly, the multiplier of the multiplied signal is changed on the basis of the rotational period of the brushless motor 20. The number of times of the interrupt processing of the microcomputer 59 can be prevented from being increased when the rotational speed of the brushless motor 20 is increased. This permits the use of a microcomputer of a relatively low processing speed. Consequently, the reliability of the inverter device 68 can be improved and the cost thereof can be reduced.

Furthermore, the microcomputer 59 obtains by operation the rotor electrical angle data according to the variations in the position signal when determining that the rotation of the brushless motor 20 is stable. The results of the operation are stored. The rotor position is estimated in the period shorter than the change period of the position signal on the basis of the stored electrical angle data. Thus, the shift of the position signal can automatically be detected to be compensated. Consequently, a high accuracy energization waveform can be supplied to the brushless motor 20 for the drive thereof even though the low-cost Hall ICs with low installation accuracy are used as the rotor position detecting means. This can improve the reliability of the position sensors and render the brushless motor 20 multipolar.

In the foregoing embodiments, a desired washing course is selected when the user operates the various operation switches on the operation panel. Alternatively, the washing machine may be provided with means for detecting volume, quality, etc. of the laundry in the rotatable tub at an initial stage of the washing course, and a most desired washing course may be selected on the basis of the results of detection by the detecting means.

The rectangular voltage is supplied to the brushless motor 20 during the starting thereof in the foregoing embodiments. The rectangular voltage is switched to the sinusoidal voltage after expiration of the predetermined time. The rectangular waveform may be switched to the sinusoidal waveform when the rotational speed or the rotational period of the brushless motor reaches a preset value after the starting, instead. The concrete values of the above-mentioned predetermined time, preset speed or period may properly be determined.

Figure 31:
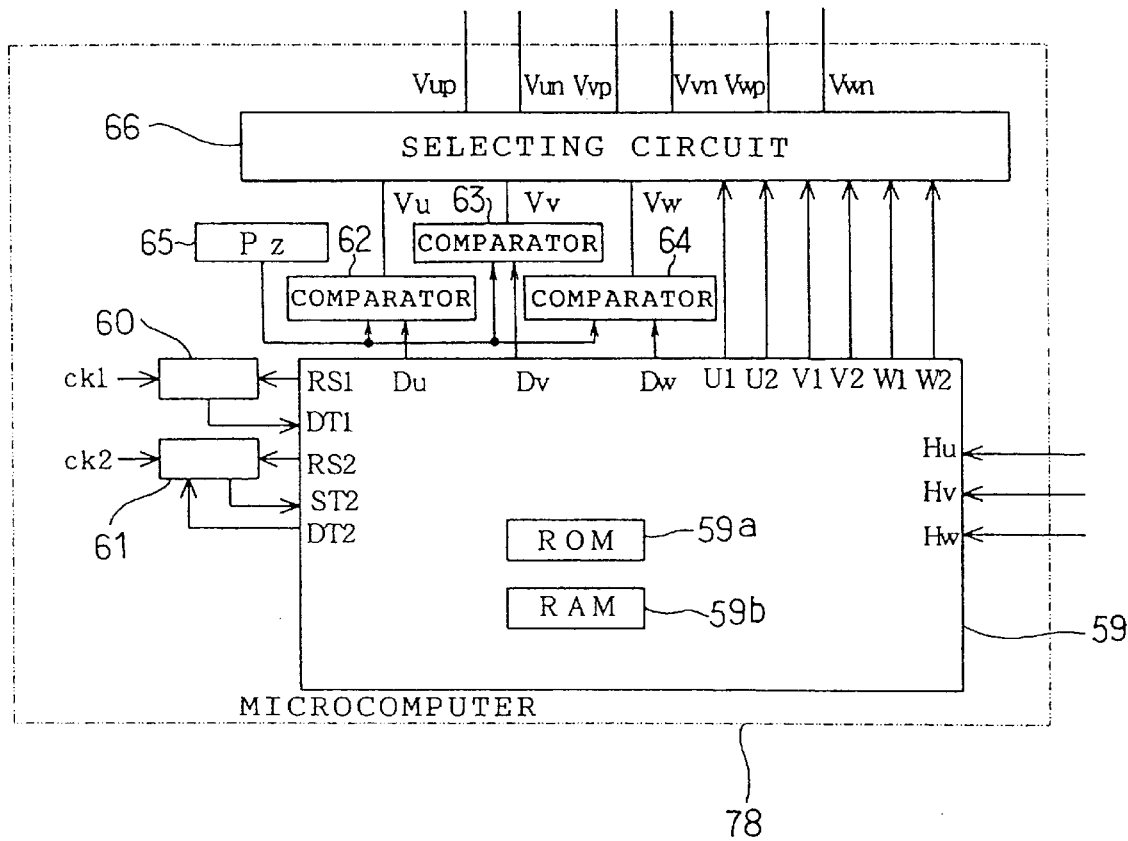
FIG. 31 schematically illustrates an electrical arrangement of a microcomputer used in the washing machine of a third embodiment in accordance with the present invention.

The microcomputer 59, counters 60 and 61, comparators 62, 63 and 64, triangular wave generating circuit 65, and selecting circuit 66 are composed as the respective discrete circuits in each of the foregoing embodiments. However, as shown as a third embodiment in FIG. 31, a one-chip microcomputer 78 may be provided which incorporates all the microcomputer 59, counters 60 and 61, comparators 62, 63 and 64, triangular wave generating circuit 65, and selecting circuit 66 employed in the first embodiment. This arrangement can further reduce the size of the inverter device 68.

The voltage command Vc and phase command Pc are set at the predetermined values respectively when the brushless motor 20 and accordingly, the rotatable tub 4 are braked in emergency in the foregoing embodiments. The values of the voltage command Vc and phase command Pc may be varied on the basis of the results of detection of the rotational period and the expiration time respectively, instead. Furthermore, the sinusoidal waveform data is stored in ROM 59a as the energization waveform data in the foregoing embodiments. Data of any other waveform may be stored if it can prevent or reduce the torque variations in the brushless motor 20.

The rewritten electrical angle data may be stored in a nonvolatile memory such as an electrically erasable/programmable read only memory (EEPROM) in the above-described second embodiment. The electrical angle data stored in the nonvolatile memory may be used when the electric power is subsequently applied to the washing machine. Furthermore, each of the determination of rotational stability, and the calculation and rewrite of electrical angle data may be executed during only a period after the power is turned on or at an initial stage of the washing operation. Additionally, each of the determination of rotational stability, and the calculation and rewrite of electrical angle data may be executed at a final stage of the manufacture of washing machines, and the washing machines may be shipped after the data obtained at the final stage is stored in the nonvolatile memory such as EEPROM.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A washing apparatus comprising:

an outer tub;

a tub rotatably mounted in the outer tub;

an agitator rotatably mounted in the rotatable tub;

a brushless motor for directly driving at least one of the rotatable tub and the agitator, the brushless motor including a rotor and a winding in which a voltage induced therein has a substantially sinusoidal waveform;

a rotor position detector which detects a rotational position of the brushless motor rotor and generates a position signal indicative thereof;

a signal forming element which forms a substantially sinusoidal energization signal corresponding to the position signal; and an energizing element which energizes the brushless motor on the basis of the energization signal formed by the signal forming element.

2. A washing apparatus according to claim 1, further comprising:

an electrical angle detector which detects an electrical angle of the rotor on the basis of the position signal;

a storage element which stores data of the energization waveforms according to electrical angles of the rotor;

a phase command forming element which forms a phase command; and a voltage command forming element which forms a voltage command, wherein the signal forming element reads out the data of the energization waveforms from the storage element corresponding to the electrical angle of the rotor, thereby forming the energization signal, and wherein the energization signal forming element determines an electrical angle of the energization waveform on the basis of the electrical angle detected by the electrical angle detector and the phase command, thereby forming the energization signal corresponding to the determined electrical angle on the basis of the data of the energization waveform read out from the storage element and the voltage command.

3. A washing apparatus according to claim 1, further comprising:

an electrical angle detector which detects an electrical angle of the rotor on the basis of the position signal;

a storage element which stores data of energization waveforms according to electrical angles of the rotor;

a phase command forming element which forms a phase command;

a voltage command forming element which forms a voltage command;

a voltage detector which detects a dc power supply voltage, wherein the energization signal forming element reads out the data of the energization waveform from the storage element corresponding to the electrical angle of the rotor detected by the electrical angle detector, thereby forming the energization signal, and wherein the energization signal forming element determines an electrical angle of the energization waveform on the basis of the electrical angle detected by the electrical angle detector and the phase command, thereby forming the energization signal corresponding to the determined electrical angle on the basis of the date of the energization waveform read out from the storage element, the voltage command, and the dc power supply voltage detected.

4. A washing apparatus according to claim 1, further comprising:

an electrical angle detector which detects an electrical angle of the rotor on the basis of the position signal; and a storage element which stores data of substantially sinusoidal energization waveforms according to electrical angles of the rotor, wherein the energization signal forming element reads out the data of the energization waveform from the storage element, the data of the energization waveform corresponding to the electrical angle of the rotor detected by the electrical angle detector, thereby forming the energization signal.

5. A washing apparatus according to claim 2 or 3, wherein the energization waveforms are substantially sinusoidal.

6. A washing apparatus according to claim 1, further comprising:

an electrical angle detector which detects an electrical angle of the rotor on the basis of the position signal generated by the position detector; and a storage element which stores data of substantially sinusoidal energization waveforms according to electrical angles of the rotor, wherein the brushless motor has a plurality of phases and the signal forming element reads out the data of the energization waveform from the storage element corresponding to the electrical angle of the rotor detected by the electrical angle detector, thereby forming the energization signal, and wherein the signal forming element forms the energization signal during a washing operation so that the brushless motor is energized such that a current flowing in each phase winding of the brushless motor is in phase with a voltage induced in each phase winding of the brushless motor.

7. A washing apparatus according to any one of claims 1, 2 and 3, wherein the brushless motor is a polyphase motor and the signal forming element forms the energization signal during a washing operation so that the brushless motor is energized such that a current flowing in each phase winding of the brushless motor is in phase with a voltage induced in each phase winding of the brushless motor.

8. A washing apparatus according to claim 6, further comprising:

a second storage element which stores data of a plurality of washing operation patterns including respective phase command patterns, and wherein the signal forming element selects the phase command pattern simultaneously with selection of the washing operation pattern so that the brushless motor is energized such that the current flowing in each phase winding of the brushless motor is in phase with the voltage induced in each phase winding of the brushless motor.

9. A washing apparatus according to claim 1, further comprising:

an electrical angle detector which detects an electrical angle of the rotor on the basis of the position signal; and a storage element which stores the data of substantially sinusoidal energization waveforms according to electrical angles of the rotor, wherein the brushless motor has a plurality of phases and the energization signal forming element reads out the data of energization waveform from the storage element corresponding to the electrical angle of the rotor detected by the electrical angle detector, thereby forming the energization signal, wherein the signal forming element forms the energization signal during a drying operation so that the brushless motor is energized such that a current flowing in each phase winding of the brushless motor leads a voltage induced in each phase winding of the brushless motor.

10. A washing apparatus according to any one of claims 1, 2 and 3, wherein the brushless motor is a polyphase motor and the energization signal forming element forms the energization signal during a drying operation so that the brushless motor is energized such that a current flowing in each phase winding of the brushless motor leads a voltage induced in each phase winding of the brushless motor.

11. A washing apparatus according to claim 9, further comprising:
a second storage element which stores data of a plurality of drying operation patterns including respective phase command patterns, and wherein the signal forming element selects the phase command pattern simultaneously with selection of the drying operation pattern so that the brushless motor is energized such that the current flowing in each phase winding of the brushless motor leads the voltage induced in each phase winding of the brushless motor.

12. A washing apparatus according to claim 1, further comprising:
an electrical angle detector which detects an electrical angle of the rotor on the basis of the position signal; and
a storage element which stores data of substantially sinusoidal energization waveforms according to electrical angles of the rotor, wherein the brushless motor has a plurality of phases and the signal forming element reads out the data of energization waveform from the storage element corresponding to the electrical angle of the rotor detected by the electrical angle detector, thereby forming an energization signal, and wherein the signal forming element forms the energization signal during braking so that the brushless motor is energized such that a current flowing in each phase winding of the brushless motor lags behind a voltage induced in each phase winding of the brushless motor.

13. A washing apparatus according to any one of claims 1, 2 and 3, wherein the brushless motor is a polyphase motor and the signal forming element forms the energization signal during braking so that the brushless motor is energized such that a current flowing in each phase winding of the brushless motor lags behind a voltage induced in each phase winding of the brushless motor.

14. A washing apparatus according to claim 1, further comprising:
an electrical angle detector which detects an electrical angle of the rotor on the basis of the position signal, the electrical angle detecting detector detecting the electrical angle of the rotor in a period shorter than a change period of the position signal generated by the rotor position detector; and
a storage element which stores data of energization waveforms according to electrical angles of the rotor, wherein the rotor position detector generates a signal having a predetermined phase relation to the voltage induced in a winding or each phase winding of the brushless motor as the position signal, and wherein the signal forming element reads out the data of energization waveform from the storage element corresponding to the electrical angle of the rotor detected by the electrical angle detector, thereby forming the energization signal.

15. A washing apparatus according to any one of claims 2, 3, 8 and 11, wherein the rotor position detector generates a signal having a predetermined phase relation to the voltage induced in a winding or each phase winding of the brushless motor as the position signal, and the electrical angle detector detects the electrical angle of the rotor in a period shorter than a change period of the position signal generated by the rotor position detector.

16. A washing apparatus according to claim 14, wherein the electrical angle detector comprises:
a multiplied signal generator which generates a signal obtained by multiplying the position signal and a counter which counts the multiplied signal generated by the multiplied signal generator,
the multiplied signal generator including a first counter counting a predetermined number of clock signals to thereby measure the change period of the position signal and a second counter counting clock signals the number of which is N-times larger than the predetermined number of clock signals, on the basis of results of measurement of the change period of the position signal.

17. A washing apparatus according to claim 16, further comprising:
a rotational period detector which detects a rotational period per revolution of the brushless motor, and wherein the multiplied signal generator changes a multiplier of the multiplied signal on the basis of the rotational period.

18. A washing apparatus according to claim 16, further comprising:
a rotational stability determination element which determines the stability of rotation of the brushless motor, and wherein the electrical angle detector further comprises:
an electrical angle data operator which obtains electrical angle data of the rotor corresponding to variations in the position signals on the basis of results of a plurality of times of measurement performed by the first counter when the rotational stability determination element determines that rotation of the motor is stable;
a storage element which stores data of the results from the electrical angle data operator; and
means for estimating a position of the rotor in a period shorter than the change period of the position signal measured by the first counter on the basis of the data of electrical angle stored by the storage element.

19. A washing apparatus according to claim 16, further comprising:
a rotational stability determination element which determines stability of rotation of the brushless motor, and wherein the electrical angle detector further comprises:
an electrical angle data operator which obtains electrical angle data of the rotor corresponding to variations in the position signals on the basis of results of a plurality of times of measurement performed by the first counter when the rotational stability determination element determines that rotation of the motor is stable;
a storage element which stores data corresponding to the results of the electrical angle data operator;
means for compensating the results of measurement of the first counter on the basis of the data of electrical angle stored in the storage element.

20. A washing apparatus according to claim 18 or 19, wherein when the rotational period detected by the rotational period detector continuously belongs to a predetermined range, the rotational stability determination element determines that the rotation is stable.

21. A washing apparatus according to claim 1, further comprising:
an electrical angle detector which detects an electrical angle of the rotor on the basis of the position signal;

a storage element which stores data of energization waveforms according to electrical angles of the rotor; and a switching element which switches a voltage supplied to the brushless motor between a rectangular wave voltage formed by logical operation of the position signal, the rectangular wave voltage being supplied to the brushless motor to start the same and a voltage based on the energization signal formed by the signal forming element and supplied to the brushless motor subsequently to starting thereof, and wherein the energization signal forming element reads out the data of energization waveform from the storage element corresponding to the electrical angle of the rotor detected by the electrical angle detector, thereby forming the energization signal.

22. A washing apparatus according to any one of claims 1, 2, 3, 8 and 11, further comprising:

a switch which switches a voltage supplied to the brushless motor between a rectangular wave voltage formed by the logical operation of the position signal, the rectangular wave voltage being supplied to the brushless motor to start the same and a voltage based on the energization signal formed by the signal forming element and supplied to the brushless motor subsequently to the starting thereof.

23. A washing apparatus according to claim 1, further comprising:

an electrical angle detector which detects an electrical angle of the rotor on the basis of the position signal; and a storage element which stores data of energization waveforms according to electrical angles of the rotor, wherein the signal forming element reads out the data of energization waveform from the storage element corresponding to the electrical angle of the rotor detected by the electrical angle detector, thereby forming the energization signal, and wherein the electrical angle detector, the storage element and the signal forming element are in a single-chip microcomputer.

24. A washing apparatus according to any one of claims 2, 3, 6 and 8, wherein the electrical angle detector, the storage element and the signal forming element are in a single-chip microcomputer.

25. A washing apparatus according to claim 7, further comprising:

a second storage element which stores data of a plurality of washing operation patterns including respective phase command patterns, and wherein the signal forming element selects the phase command pattern simultaneously with selection of the washing operation pattern so that the brushless motor is energized such that the current flowing in each phase winding of the brushless motor is in phase with the voltage induced in each phase winding of the brushless motor.

26. A washing apparatus according to claim 10, further comprising:

a second storage element which stores data of a plurality of drying operation patterns including respective phase command patterns, and wherein the signal forming element selects the phase command pattern simultaneously with selection of the drying operation pattern so that the brushless motor is energized such that the current flowing in each phase winding of the brushless motor leads the voltage induced in each phase winding of the brushless motor.

27. A washing apparatus according to claim 11, wherein the rotor position detector generates a signal having a predetermined phase relation to the voltage induced in a winding or each phase winding of the brushless motor as the position signal, and the electrical angle detector detects the electrical angle of the rotor in a period shorter than a change period of the position signal generated by the rotor position detector.

28. A washing apparatus according to claim 27, wherein the electrical angle detector comprises:

a multiplied signal generator which generates a signal obtained by multiplying the position signal and a counter which counts the multiplied signal generated by the multiplied signal generator, the multiplied signal generator including a first counter counting a predetermined number of clock signals to thereby measure the change period of the position signal and a second counter counting clock signals the number of which is N-times larger than the predetermined number of clock signals, on the basis of results of measurement of the change period of the position signal.

29. A washing apparatus according to claim 28, further comprising:

a rotational period detector which detects a rotational period per revolution of the brushless motor, and wherein the multiplied signal generator changes a multiplier of the multiplied signal on the basis of the rotational period.

30. A washing apparatus according to claim 28, further comprising:

a rotational stability determination element which determines stability of rotation of the brushless motor, and wherein the electrical angle detector further comprises:

an electrical angle data operator which obtains electrical angle data of the rotor corresponding to variations in the position signals on the basis of results of a plurality of times of measurement performed by the first counter when the rotational stability determination element determines that rotation of the motor is stable;

a storage element which stores data of the results from the electrical angle data operator; and means for estimating a position of the rotor in a period shorter than the change period of the position signal measured by the first counter on the basis of the data of electrical angle stored by the storage element.

31. A washing apparatus according to claim 28, further comprising:

a rotational stability determination element which determines stability of rotation of the brushless motor, and wherein the electrical angle detector further comprises:

an electrical angle data operator which obtains electrical angle data of the rotor corresponding to variations in the position signals on the basis of results of a plurality of times of measurement performed by the first counter when the rotational stability determination element determines that rotation of the motor is stable;

a storage element which stores data of the results from the electrical angle data operator; and means for estimating a position of the rotor in a period shorter than the change period of the position signal measured by the first counter on the basis of the data of electrical angle stored by the storage element.

32. A washing apparatus according to claim 30 or 31, wherein when the rotational period detected by the rotational period detector continuously belongs to a predetermined range, the rotational stability determination element determines that the rotation is stable.

33. A washing apparatus according to claim 8, further comprising:
a switch which switches a voltage supplied to the brushless motor between a rectangular wave voltage formed by logical operation of the position signal generator, the rectangular wave voltage being supplied to the brushless motor to start the same and a voltage based on the energization signal formed by the signal forming element and supplied to the brushless motor subsequently to starting thereof.

34. A washing apparatus according to claim 11, further comprising:
a switch which switches a voltage supplied to the brushless motor between a rectangular wave voltage formed by logical operation of the position signal generator, the rectangular wave voltage being supplied to the brushless motor to start the same and a voltage based on the energization signal formed by the signal forming element and supplied to the brushless motor subsequently to starting thereof.

35. A washing apparatus according to claim 25, further comprising:
a switch which switches a voltage supplied to the brushless motor between a rectangular wave voltage formed by the logical operation of the position signal, the rectangular wave voltage being supplied to the brushless motor to start the same and a voltage based on the energization signal formed by the signal forming element and supplied to the brushless motor subsequently to the starting thereof.

36. A washing apparatus according to claim 26, further comprising:
a switch which switches a voltage supplied to the brushless motor between a rectangular wave voltage formed by the logical operation of the position signal, the rectangular wave voltage being supplied to the brushless motor to start the same and a voltage based on the energization signal formed by the signal forming element and supplied to the brushless motor subsequently to the starting thereof.

37. A washing apparatus according to claim 26, wherein the rotor position detector generates a signal having a predetermined phase relation to the voltage induced in a winding or each phase winding of the brushless motor as the position signal, and the electrical angle detector detects the electrical angle of the rotor in a period shorter than a change period of the position signal generated by the rotor position detector.

38. A washing apparatus according to claim 37, wherein the electrical angle detector comprises:
a multiplied signal generator which generates a signal obtained by multiplying the position signal and a counter which counts the multiplied signal generated by the multiplied signal generator,
the multiplied signal generator including a first counter counting a predetermined number of clock signals to thereby measure the change period of the position signal and a second counter counting clock signals the number of which is N-times larger than the predetermined number of clock signals, on the basis of results of measurement of the change period of the position signal.

39. A washing apparatus according to claim 38, further comprising:
a rotational period detector which detects a rotational period per revolution of the brushless motor, and wherein the multiplied signal generator changes a multiplier of the multiplied signal on the basis of the rotational period.

40. A washing apparatus according to claim 38, further comprising:
a rotational stability determination element which determines stability of rotation of the brushless motor, and wherein the electrical angle detector further comprises:
an electrical angle data operator which obtains electrical angle data of the rotor corresponding to variations in the position signals on the basis of results of a plurality of times of measurement performed by the first counter when the rotational stability determination element determines that rotation of the motor is stable;
a storage element which stores data of the results from the electrical angle data operator; and
means for estimating a position of the rotor in a period shorter than the change period of the position signal measured by the first counter on the basis of the data of electrical angle stored by the storage element.

41. A washing apparatus according to claim 38, further comprising:
a rotational stability determination element which determines stability of rotation of the brushless motor, and wherein the electrical angle detector further comprises:
an electrical angle data operator which obtains electrical angle data of the rotor corresponding to variations in the position signals on the basis of results of a plurality of times of measurement performed by the first counter when the rotational stability determination element determines that rotation of the motor is stable;
a storage element which stores data of the results from the electrical angle data operator; and
means for estimating a position of the rotor in a period shorter than the change period of the position signal measured by the first counter on the basis of the data of electrical angle stored by the storage element.

42. A washing apparatus according to claim 40, wherein when the rotational period detected by the rotational period detector continuously belongs to a predetermined range, the rotational stability determination element determines that the rotation is stable.

43. A washing apparatus according to claim 41, wherein when the rotational period detected by the rotational period detector continuously belongs to a predetermined range, the rotational stability determination element determines that the rotation is stable.

44. A washing apparatus according to claim 25, wherein the rotor position detector generates a signal having a predetermined phase relation to the voltage induced in a winding or each phase winding of the brushless motor as the position signal, and the electrical angle detector detects the electrical angle of the rotor in a period shorter than a change period of the position signal generated by the rotor position detector.

45. A washing apparatus according to claim 26, wherein the rotor position detector generates a signal having a predetermined phase relation to the voltage induced in a winding or each phase winding of the brushless motor as the position signal, and the electrical angle detector detects the electrical angle of the rotor in a period shorter than a change period of the position signal generated by the rotor position detector.

46. A washing apparatus according to claim 25, further comprising:

a switch which switches a voltage supplied to the brushless motor between a rectangular wave voltage formed by the logical operation of the position signal, the rectangular wave voltage being supplied to the brushless motor to start the same and a voltage based on the energization signal formed by the signal forming element and supplied to the brushless motor subsequently to the starting thereof.

47. A washing apparatus according to claim 26, further comprising:

a switch which switches a voltage supplied to the brushless motor between a rectangular wave voltage formed by the logical operation of the position signal, the rectangular wave voltage being supplied to the brushless motor to start the same and a voltage based on the energization signal formed by the signal forming element and supplied to the brushless motor subsequently to the starting thereof.

48. A washing apparatus according to claim 25, wherein the electrical angle detector, the storage element and the signal forming element are in a single-chip microcomputer.

* * * * *